(12) United States Patent
Wagner

(10) Patent No.: US 8,694,902 B2
(45) Date of Patent: Apr. 8, 2014

(54) DEVICE, METHOD, AND GRAPHICAL USER INTERFACE FOR MODIFYING A MULTI-COLUMN APPLICATION

(75) Inventor: Oliver P. Wagner, San Francisco, CA (US)

(73) Assignee: Apple Inc., Cupertino, CA (US)

(*) Notice: Subject to any disclaimer, the term of this patent is extended or adjusted under 35 U.S.C. 154(b) by 455 days.

(21) Appl. No.: 12/780,780

(22) Filed: May 14, 2010

(65) Prior Publication Data

US 2011/0167366 A1 Jul. 7, 2011

Related U.S. Application Data

(60) Provisional application No. 61/292,809, filed on Jan. 6, 2010.

(51) Int. Cl.
*G06F 3/048* (2013.01)

(52) U.S. Cl.
USPC .......................................... 715/765

(58) Field of Classification Search
USPC ................. 715/765, 768, 773, 780, 783, 792; 345/173
See application file for complete search history.

(56) References Cited

U.S. PATENT DOCUMENTS

| | | | |
|---|---|---|---|
| 7,689,921 B2* | 3/2010 | Rajarajan et al. | 715/744 |
| 2007/0117074 A1* | 5/2007 | Maurides et al. | 434/247 |
| 2008/0057926 A1* | 3/2008 | Forstall et al. | 455/415 |
| 2008/0094371 A1* | 4/2008 | Forstall et al. | 345/173 |
| 2008/0174570 A1* | 7/2008 | Jobs et al. | 345/173 |
| 2008/0295017 A1* | 11/2008 | Tseng et al. | 715/777 |
| 2009/0160802 A1* | 6/2009 | Yasumi | 345/173 |
| 2010/0262928 A1* | 10/2010 | Abbott | 715/769 |
| 2011/0029906 A1* | 2/2011 | Hirai | 715/765 |
| 2012/0054673 A1* | 3/2012 | Kim et al. | 715/784 |

* cited by examiner

*Primary Examiner* — Rashawn Tillery
(74) *Attorney, Agent, or Firm* — Morgan, Lewis & Bockius LLP

(57) ABSTRACT

A method includes: displaying simultaneously a plurality of columns in a multi-column application that comprises: a first column that includes user-modifiable content items; and a second column that includes user-selectable items; detecting a first input that corresponds to a request to enter an edit mode for the first column; in response to detecting the first input: entering the edit mode for the first column; and deactivating the user-selectable items in the second column; while in the edit mode for the first column: detecting one or more edit inputs; and in response to detecting the edit inputs, editing one or more of the user-modifiable content items in the first column; detecting a second input that corresponds to a request to exit the edit mode for the first column; and in response to detecting the second input: exiting the edit mode, and reactivating the user-selectable items in the second column.

28 Claims, 34 Drawing Sheets

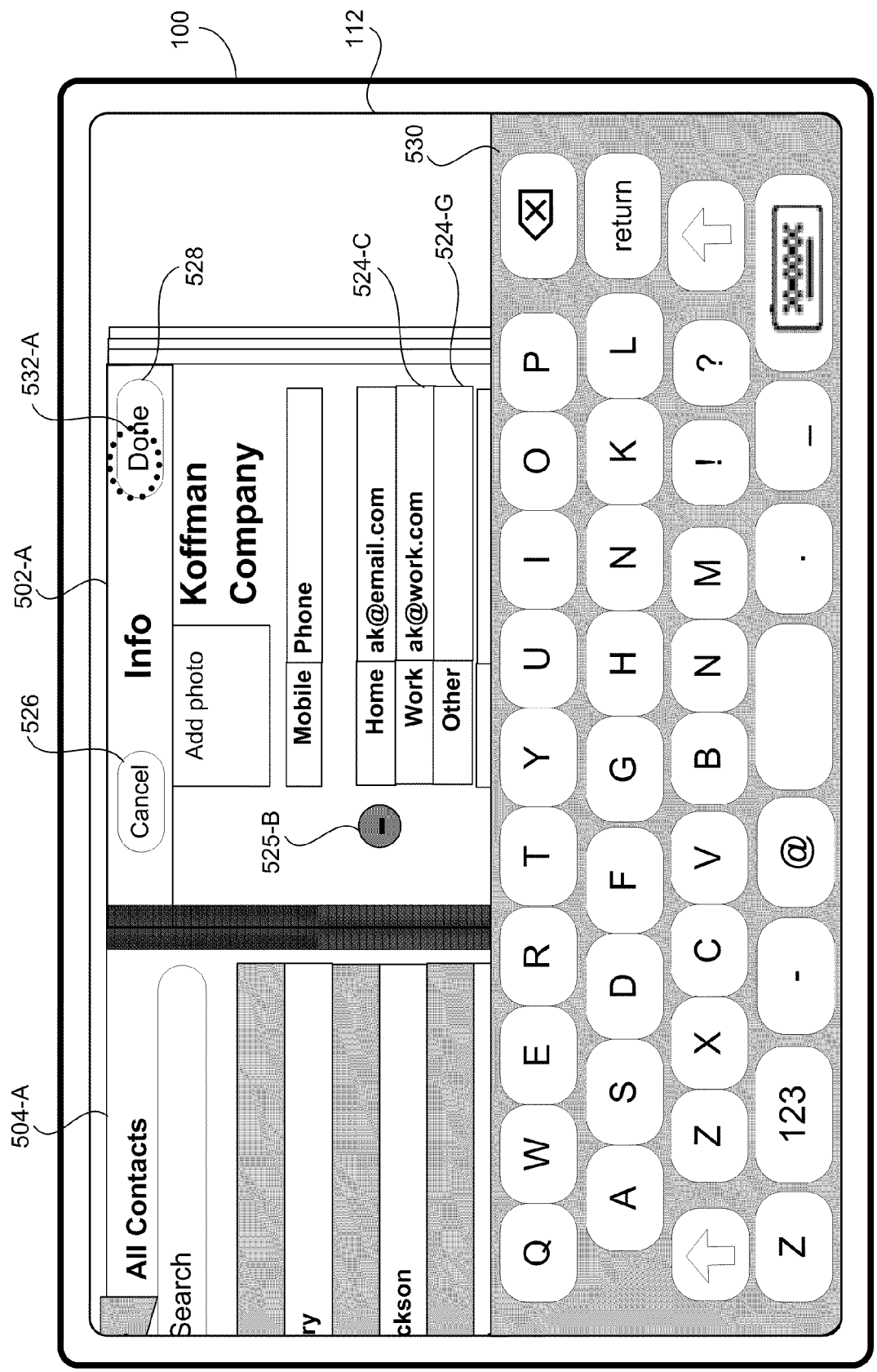

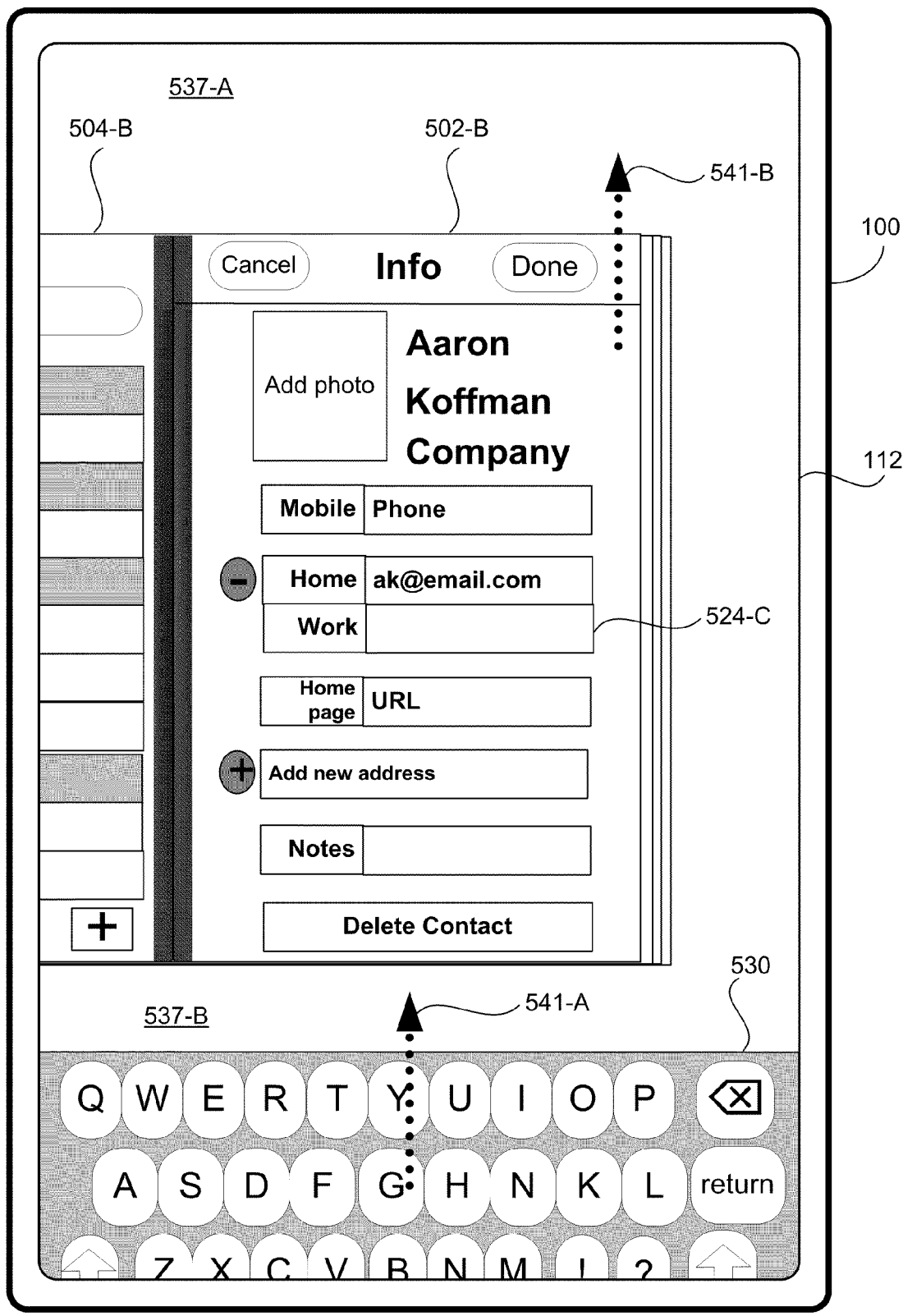
Figure 5N        500N

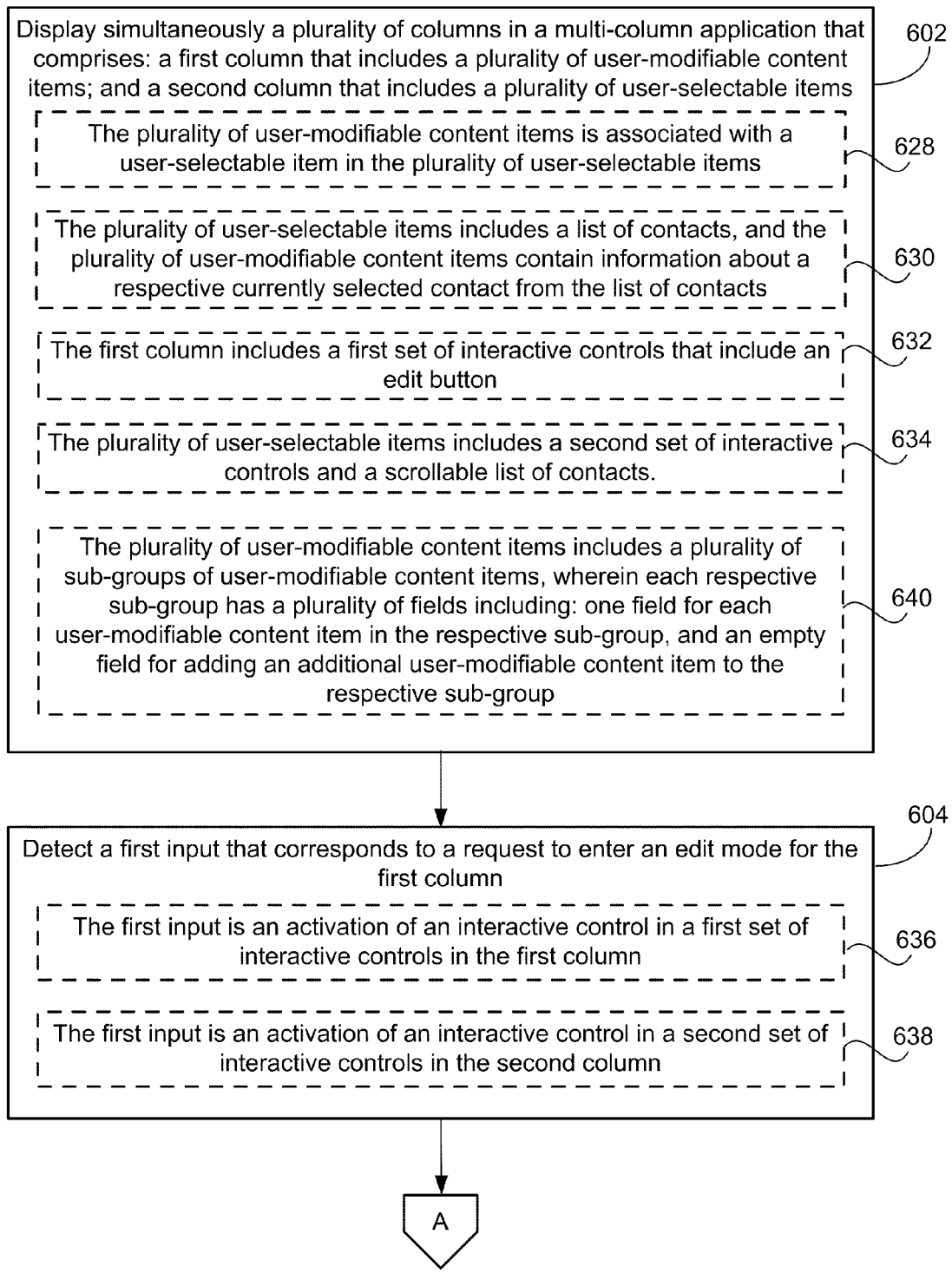
Figure 6A        600

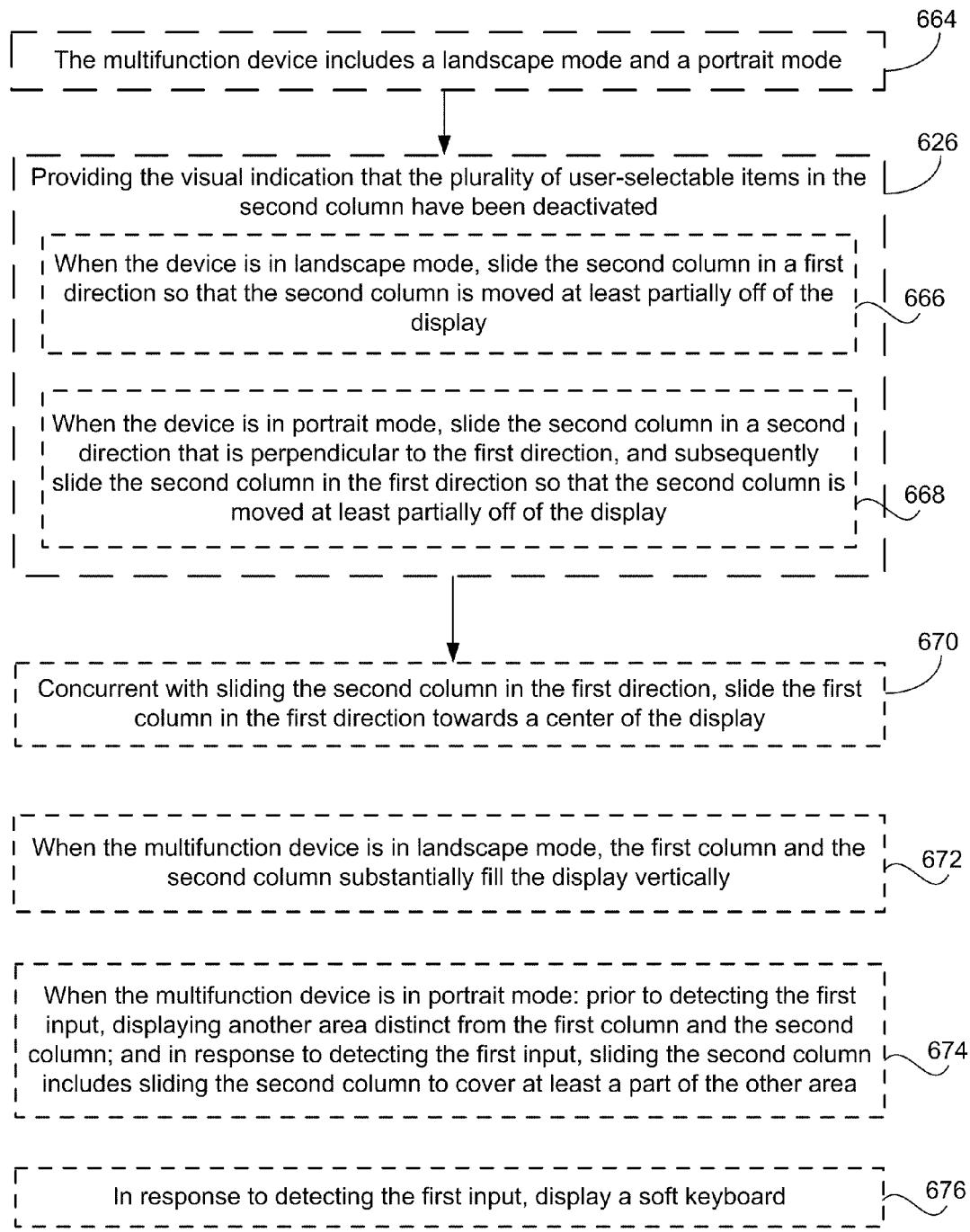
Figure 6D     600

```
┌──────────────────────────────────────────────────────────────────┐
│  In response to the first input, slide a soft keyboard upwards from the bottom of    ┤──678
│                          the display
│   ┌──────────────────────────────────────────────────────────┐
│   │  When the device is in landscape mode, sliding the soft keyboard upwards    │
│   │  from the bottom of the display includes sliding the soft keyboard upwards ├──680
│   │     to cover at least a portion of the first column and the second column   │
│   └──────────────────────────────────────────────────────────┘
│
│   ┌──────────────────────────────────────────────────────────┐
│   │     When the device is in portrait mode, sliding the soft keyboard upwards  ├──682
│   │  from the bottom of the display includes sliding the soft keyboard upwards  │
│   │    so as to fill at least a part of the space previously occupied by the first  │
│   │   column and the second column without covering any portion of the first    │
│   │                   column or the second column                │
│   └──────────────────────────────────────────────────────────┘
└──────────────────────────────────────────────────────────────────┘
```

Figure 6E     <u>600</u>

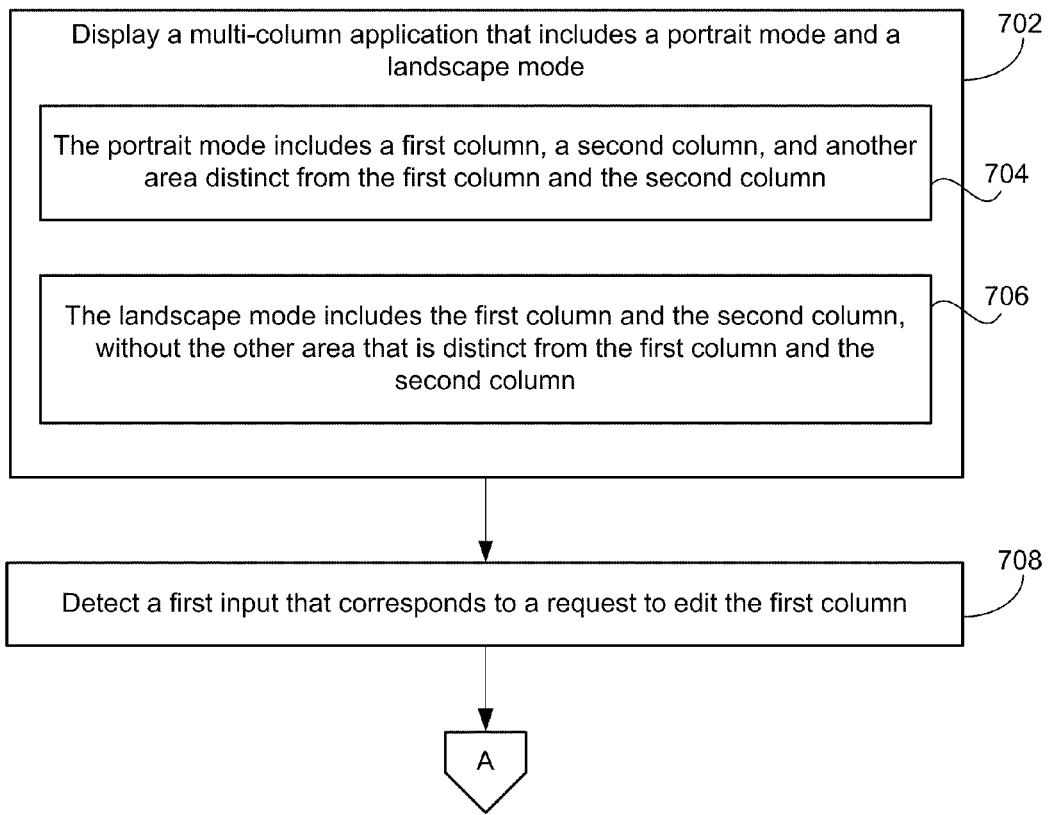
Figure 7A      700

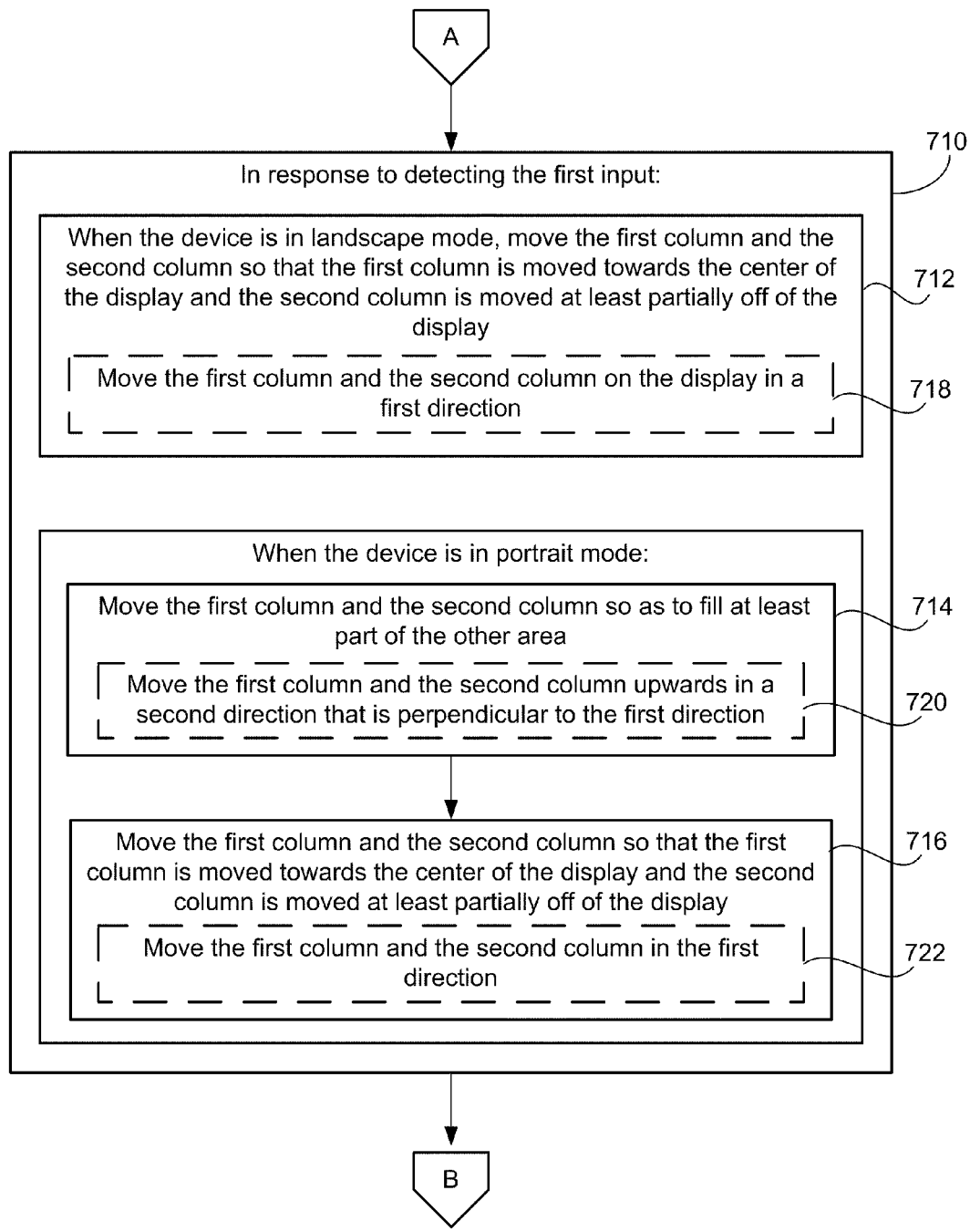
Figure 7B     700

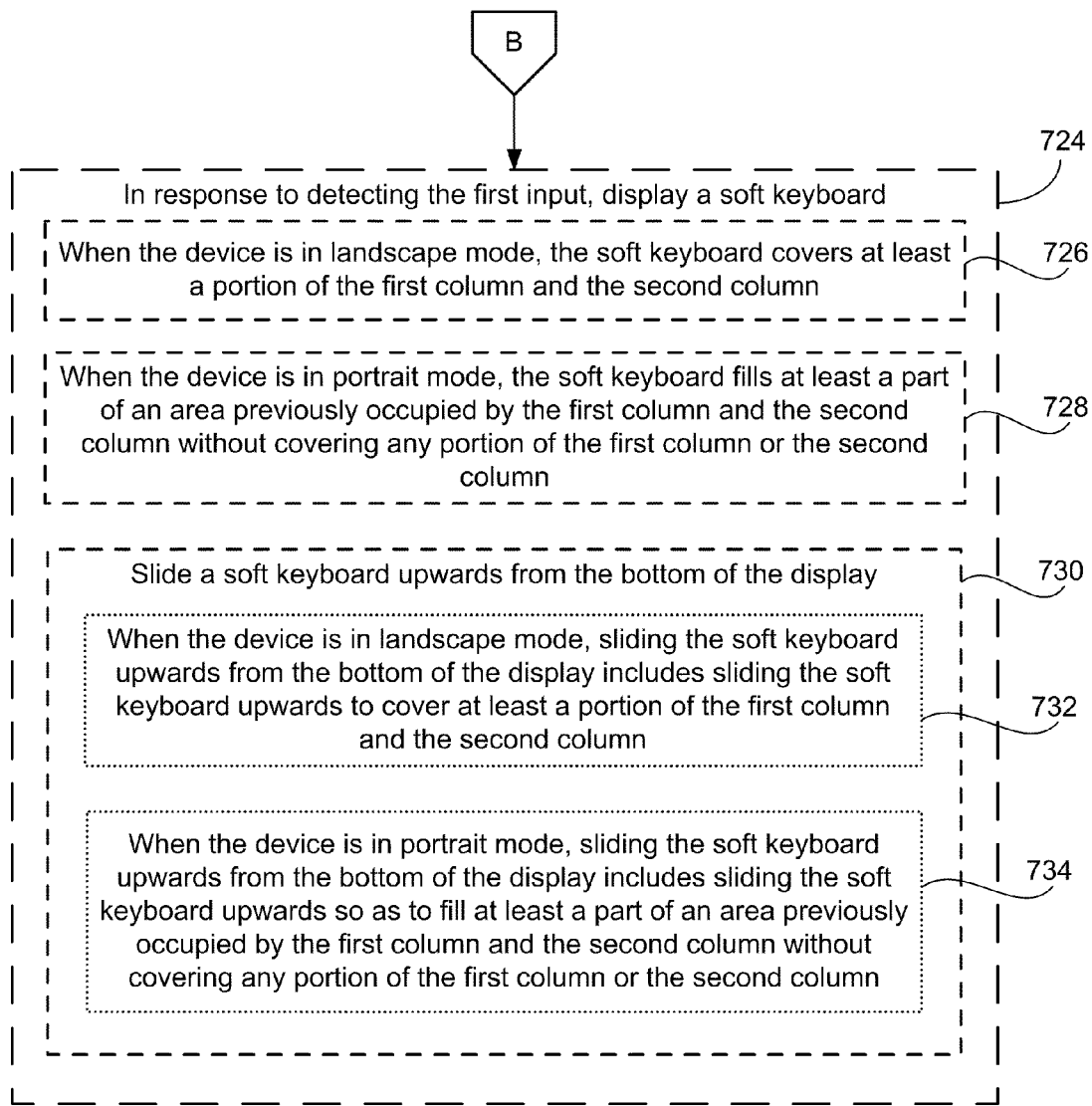
Figure 7C        700

DEVICE, METHOD, AND GRAPHICAL USER INTERFACE FOR MODIFYING A MULTI-COLUMN APPLICATION

RELATED APPLICATIONS

This application claims priority to U.S. Provisional Application Ser. No. 61/292,809, filed Jan. 6, 2010, entitled "Device, Method, and Graphical User Interface for Modifying a Multi-Column Application," which is incorporated by reference herein in its entirety.

TECHNICAL FIELD

The disclosed embodiments relate generally to electronic devices with touch-sensitive surfaces, and more particularly to electronic devices with touch-sensitive surfaces that modify operation of a multi-column application.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

But existing methods for modifying a multi-column application are cumbersome and inefficient. For example, displaying a multi-column application in various modes is tedious and creates a significant cognitive burden on a user. In addition, some conventional methods take longer than necessary to complete a task, thereby wasting a user's time and a device's power reserve, which can be particularly important consideration for battery-operated devices.

SUMMARY

Accordingly, there is a need for computing devices with faster, more efficient methods and interfaces for modifying a multi-column application. Such methods and interfaces may complement or replace conventional methods for modifying a multi-column application. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a multifunction device with a display and a touch-sensitive surface. The method includes: displaying simultaneously a plurality of columns in a multi-column application that comprises a first column that includes a plurality of user-modifiable content items, and a second column that includes a plurality of user-selectable items; detecting a first input that corresponds to a request to enter an edit mode for the first column; in response to detecting the first input, entering the edit mode for the first column, and deactivating the plurality of user-selectable items in the second column; while in the edit mode for the first column, detecting one or more edit inputs, and in response to detecting the one or more edit inputs, editing one or more of the plurality of user-modifiable content items in the first column; detecting a second input that corresponds to a request to exit the edit mode for the first column; and in response to detecting the second input, exiting the edit mode for the first column, and reactivating the plurality of user-selectable items in the second column.

In accordance with some embodiments, a method is performed at a multifunction device with a display and a touch-sensitive surface. The method includes: displaying a multi-column application that includes a portrait mode and a landscape mode, wherein: the portrait mode includes a first column, a second column, and another area distinct from the first column and the second column; and the landscape mode includes the first column and the second column, without the other area that is distinct from the first column and the second column; detecting a first input that corresponds to a request to edit the first column; and in response to detecting the first input: when the device is in landscape mode, moving the first column and the second column so that the first column is moved towards the center of the display and the second column is moved at least partially off of the display; and when the device is in portrait mode, moving the first column and the second column so as to fill at least part of the other area, and moving the first column and the second column so that the first column is moved towards the center of the display and the second column is moved at least partially off of the display.

In accordance with some embodiments, a multifunction device includes a display, a touch-sensitive surface, one or more processors, memory, and one or more programs; the one or more programs are stored in the memory and configured to be executed by the one or more processors and the one or more programs include instructions for performing the operations of any of the methods described above. In accordance with some embodiments, a graphical user interface on a multifunction device with a display, a touch-sensitive surface, a memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions which when executed by a multifunction device with a display and a touch-sensitive surface, cause the device to perform the operations of any of the methods described above. In accordance with some embodiments, a multifunction device includes: a display; a touch-sensitive surface; means for performing the operations of any of the methods described above. In accordance with some embodiments, an information processing apparatus, for use in a multifunction device with a display and a touch-sensitive surface, includes means for performing the operations of any of the methods described above.

Thus, multifunction devices with displays and touch-sensitive surfaces are provided with faster, more efficient methods and interfaces for modifying a multi-column application, thereby increasing the effectiveness, efficiency, and user satisfaction with such devices. Such methods and interfaces may complement or replace conventional methods for modifying a multi-column application.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 6A-6E are flow diagrams illustrating a method of modifying a multi-column application in accordance with some embodiments.

FIGS. 7A-7C are flow diagrams illustrating a method of modifying a multi-column application in accordance with some embodiments.

DESCRIPTION OF EMBODIMENTS

Figure 1A:
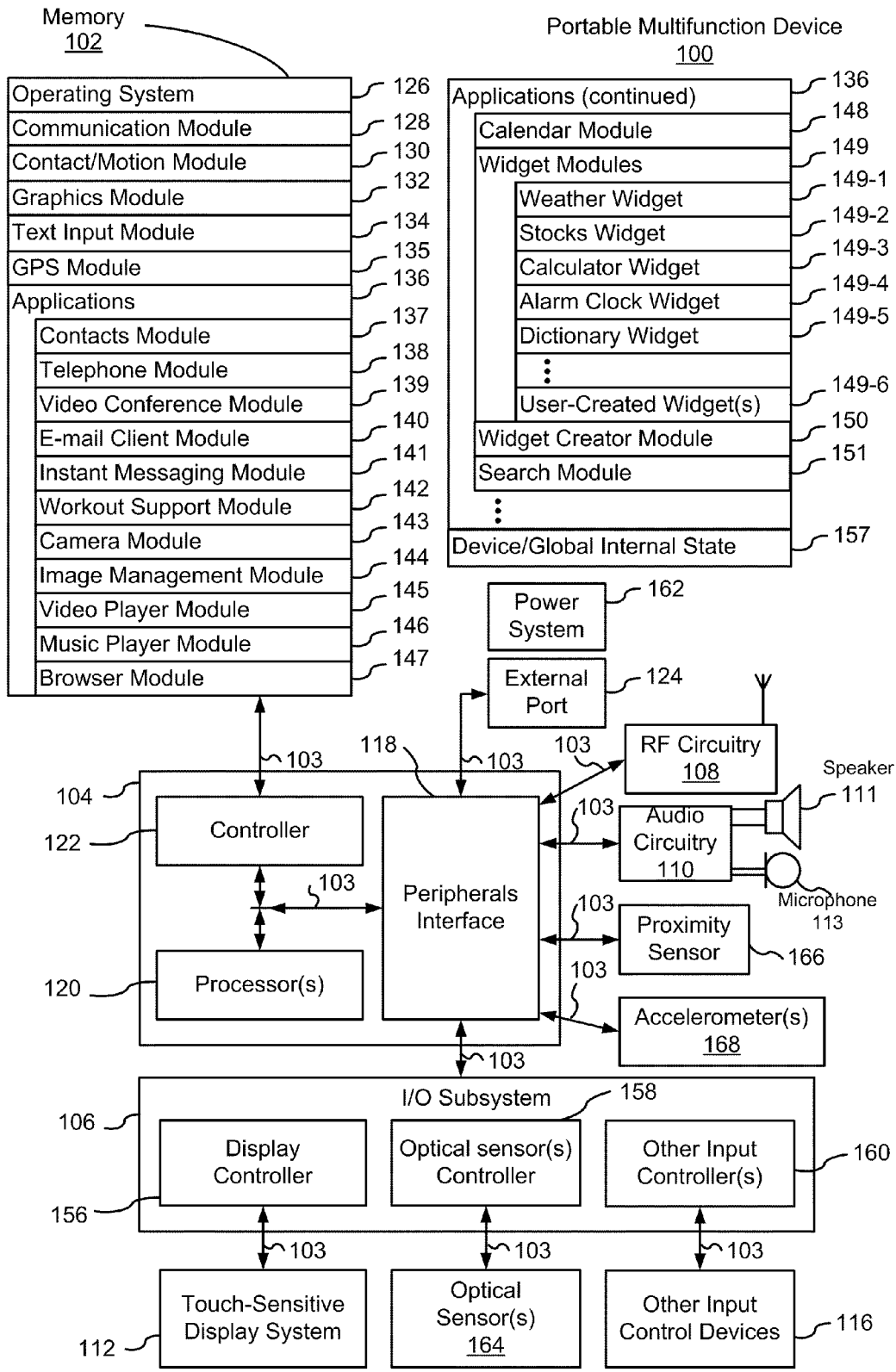
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1024×768-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

As used herein, the term "video resolution" of a display refers to the density of pixels along each axis or in each dimension of the display. The video resolution is often measured in a dots-per-inch (DPI) unit, which counts the number of pixels that can be placed in a line within the span of one inch along a respective dimension of the display.

Embodiments of computing devices, user interfaces for such devices, and associated processes for using such devices are described. In some embodiments, the computing device is a portable communications device, such as a mobile telephone, that also contains other functions, such as PDA and/or music player functions. Exemplary embodiments of portable multifunction devices include, without limitation, the iPhone® and iPod Touch® devices from Apple Inc. of Cupertino, Calif. Other portable devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent applications Ser. No. 11/459,606, "Keyboards For Portable Electronic Devices," filed Jul. 24, 2006, and U.S. Ser. No. 11/459,615, "Touch Screen Keyboards For Portable Electronic Devices," filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
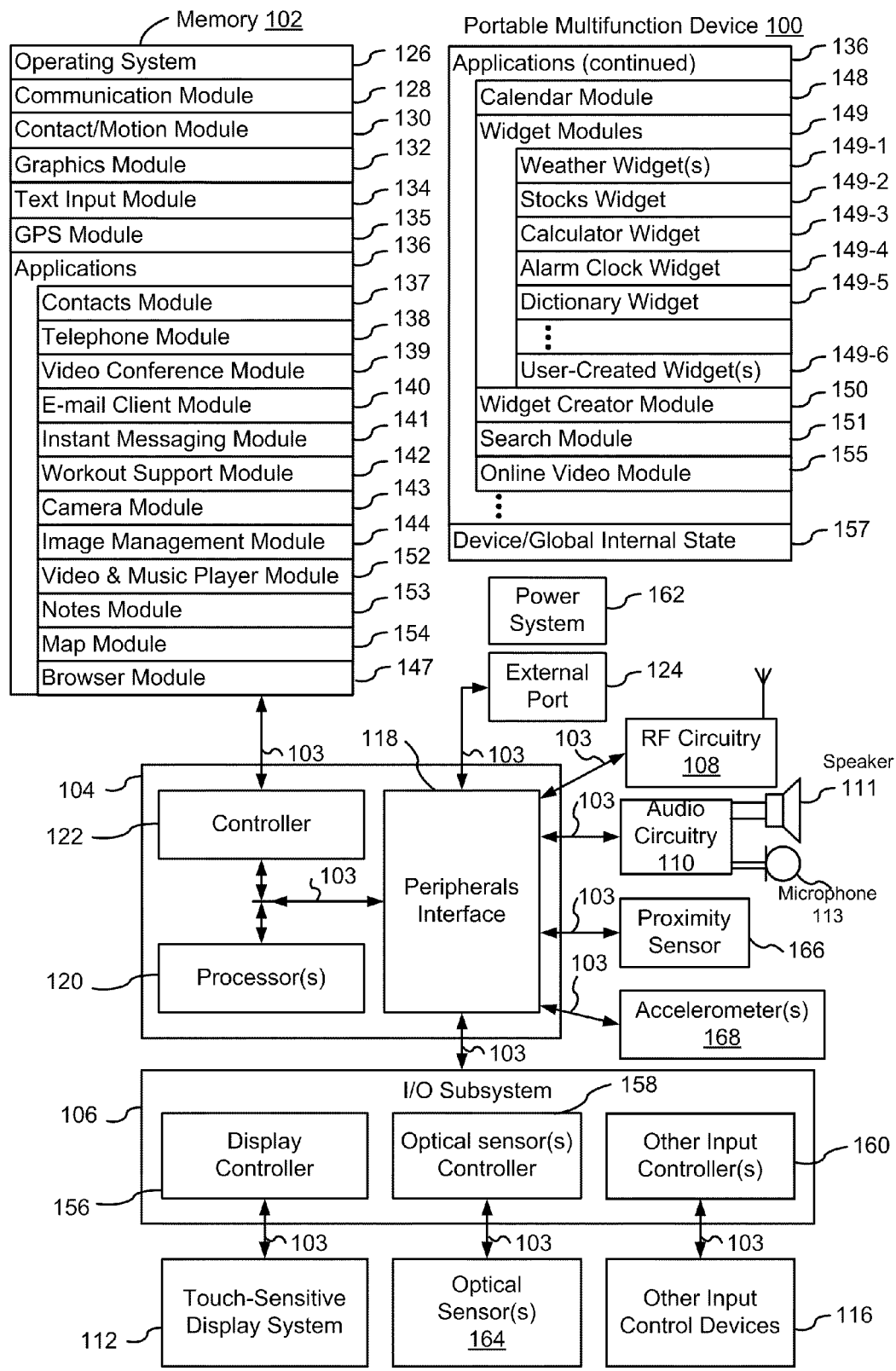

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
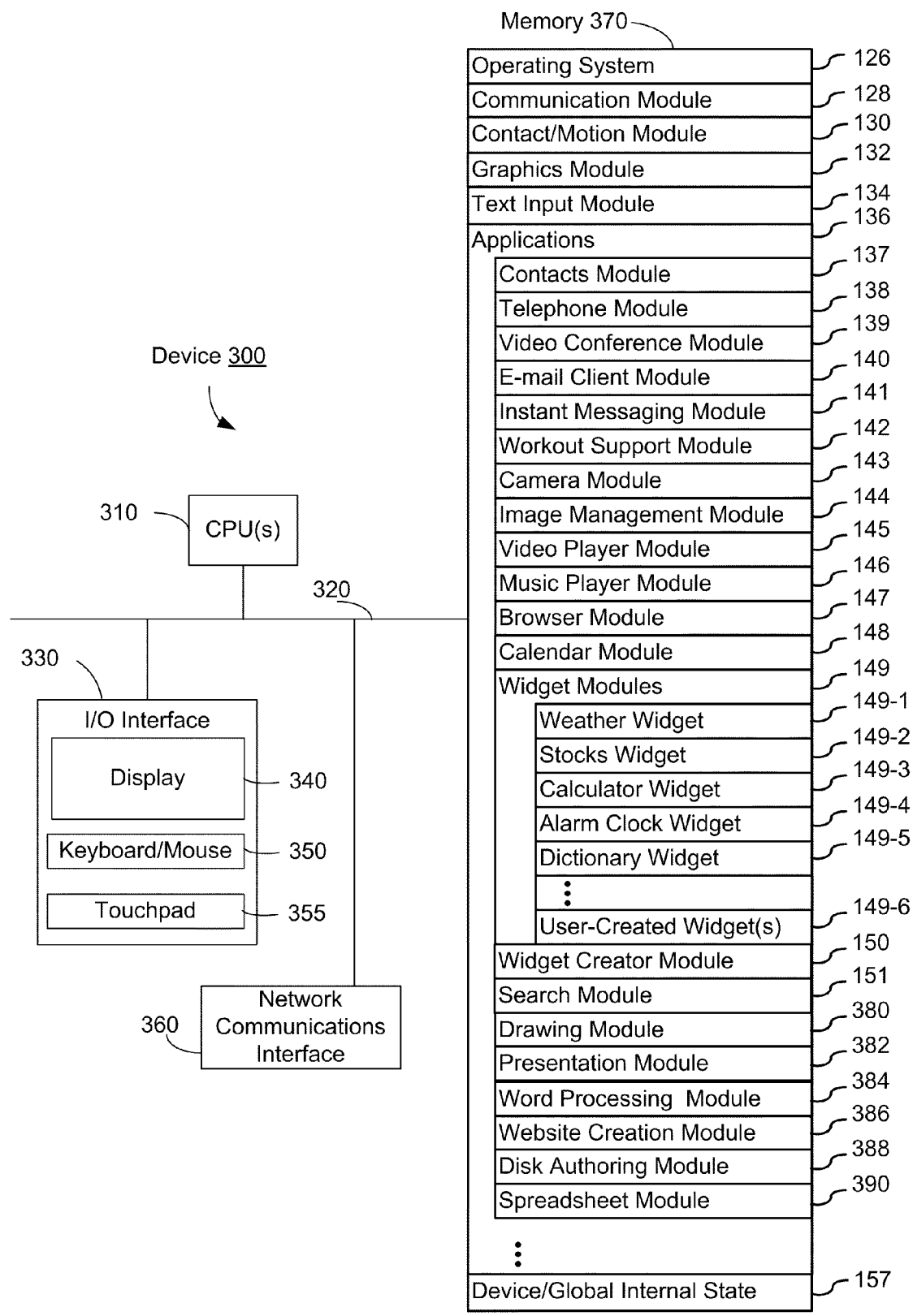
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module 145;
- music player module 146;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
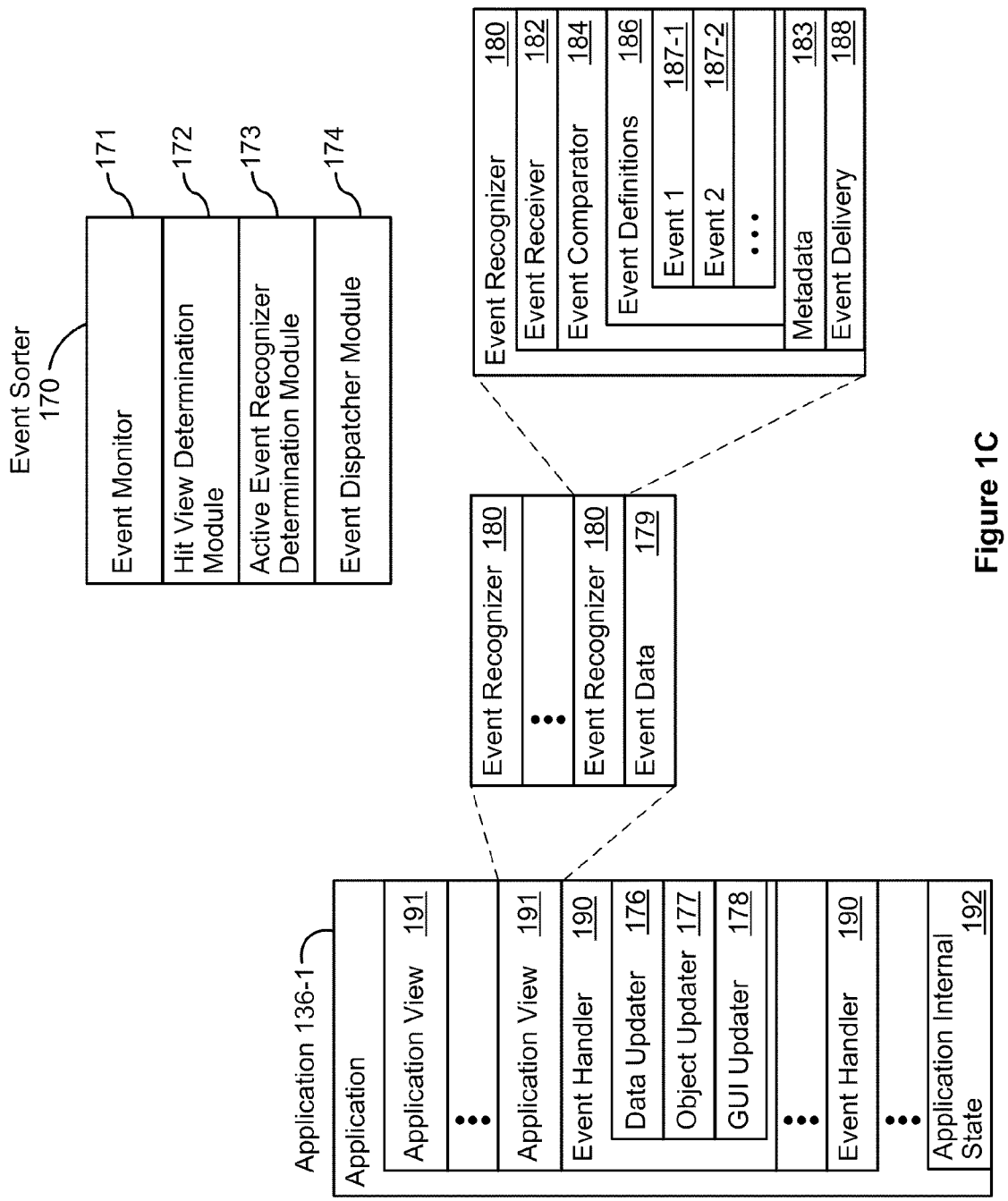
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
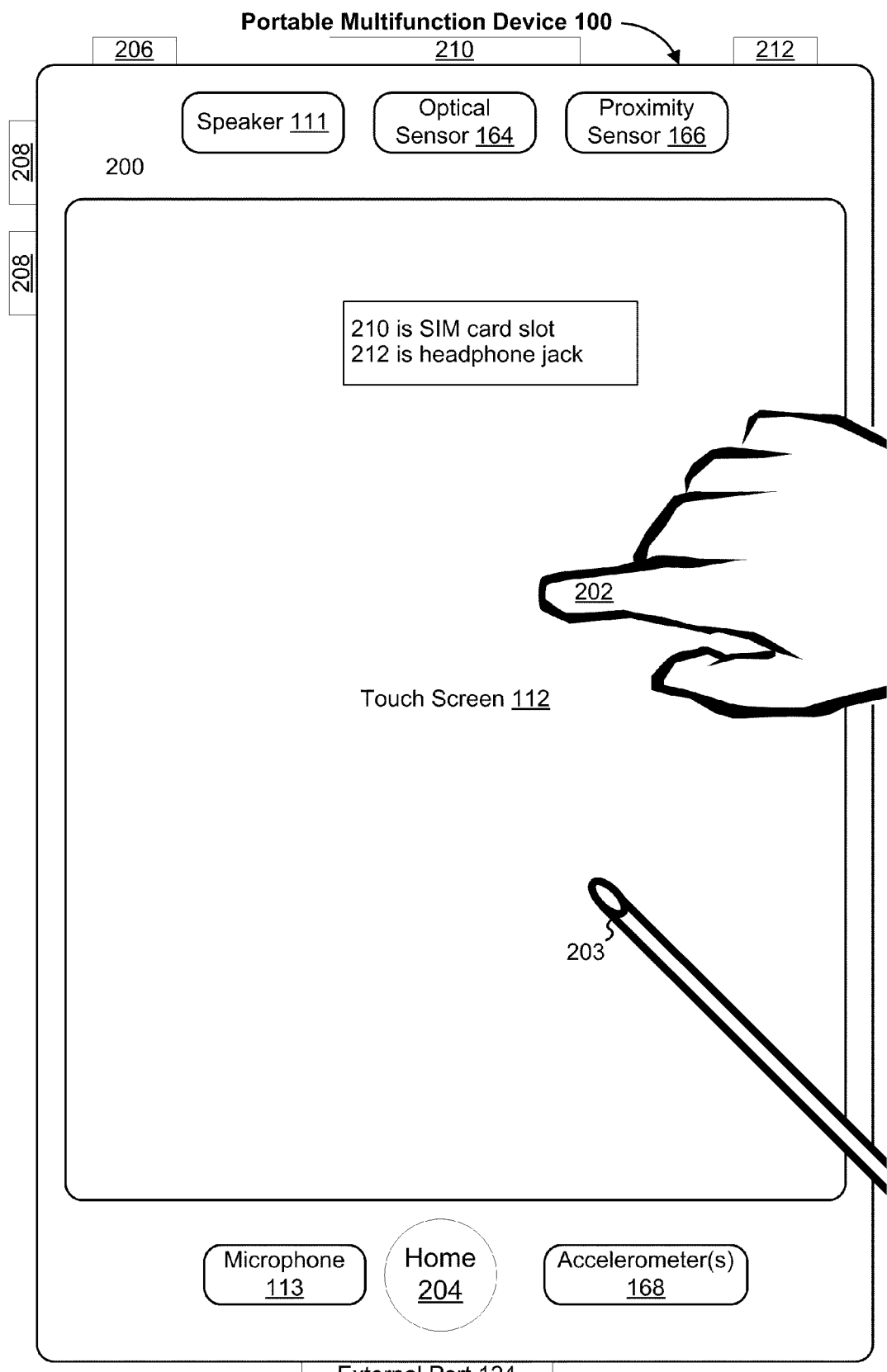
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
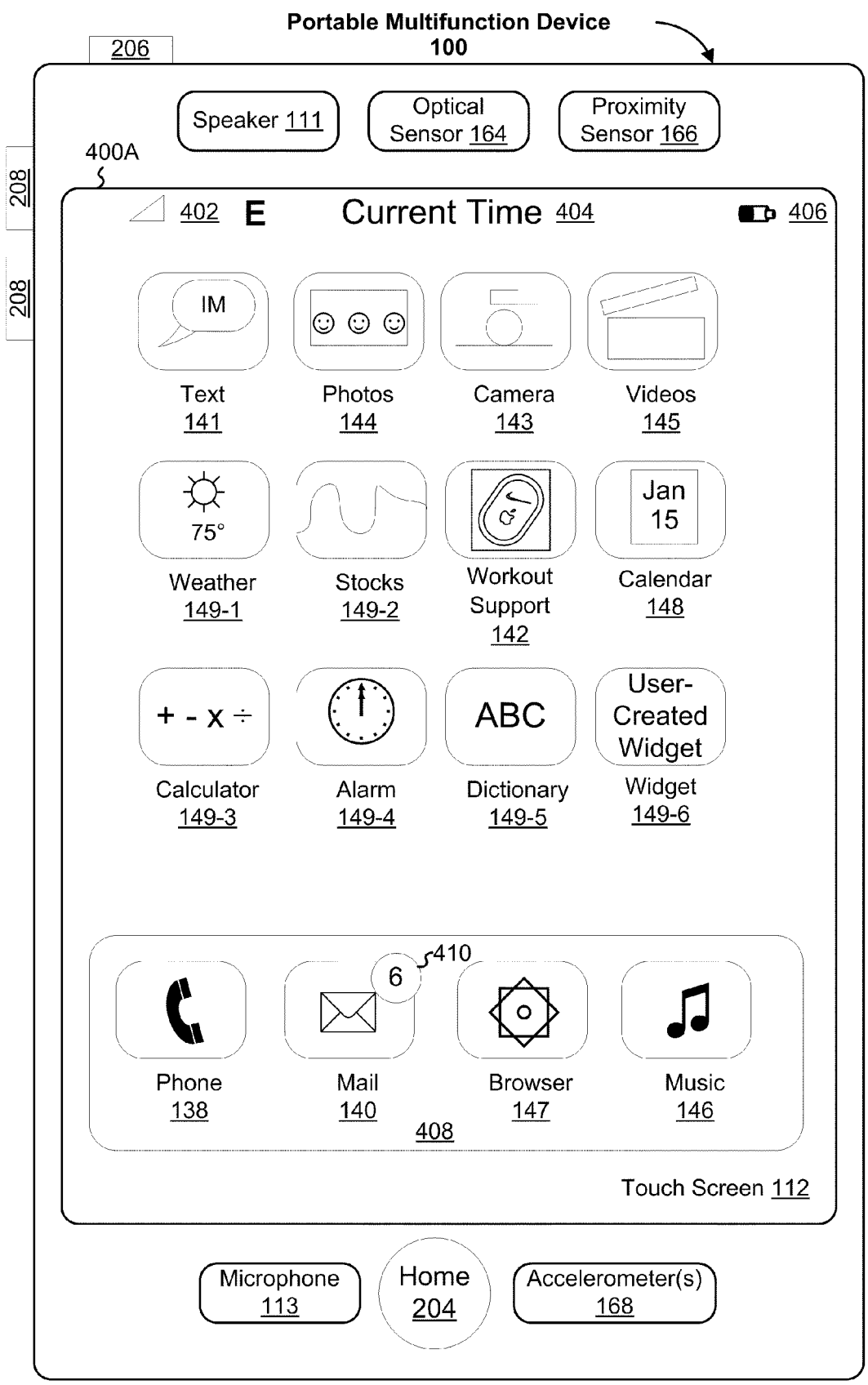
FIGS. 4A and 4B illustrate exemplary user interfaces for a menu of applications on a portable multifunction device in accordance with some embodiments.
Figure 4B:
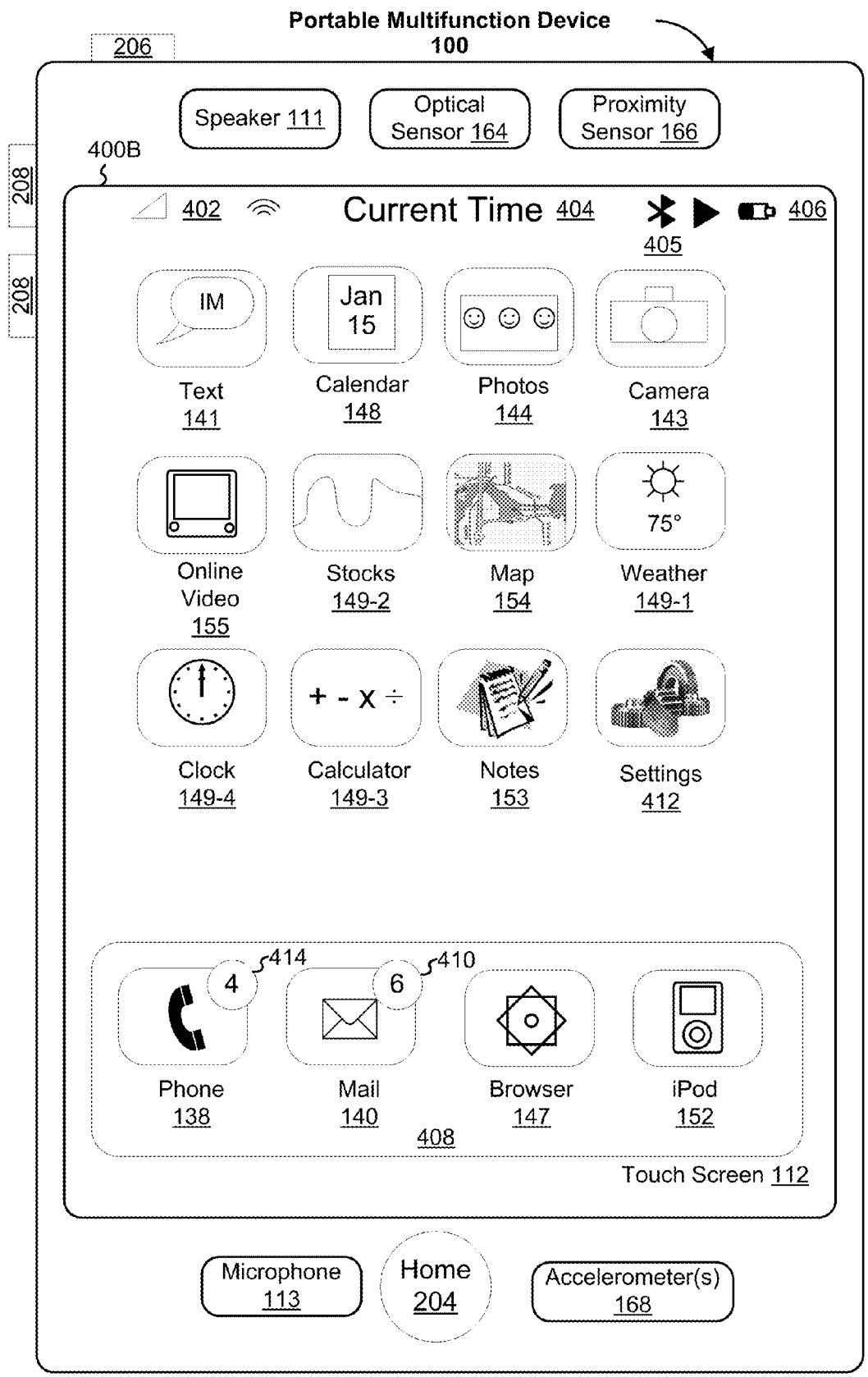

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Phone 138, which may include an indicator 414 of the number of missed calls or voicemail messages;
  - E-mail client 140, which may include an indicator 410 of the number of unread e-mails;
  - Browser 147; and
  - Music player 146; and
- Icons for other applications, such as:
  - IM 141;
  - Image management 144;
  - Camera 143;
  - Video player 145;
  - Weather 149-1;
  - Stocks 149-2;

Workout support 142;
Calendar 148;
Calculator 149-3;
Alarm clock 149-4;
Dictionary 149-5; and
User-created widget 149-6.

In some embodiments, user interface 400B includes the following elements, or a subset or superset thereof:
402, 404, 405, 406, 141, 148, 144, 143, 149-3, 149-2, 149-1, 149-4, 410, 414, 138, 140, and 147, as described above;
Map 154;
Notes 153;
Settings 412, which provides access to settings for device 100 and its various applications 136, as described further below;
Video and music player module 152, also referred to as iPod (trademark of Apple Inc.) module 152; and
Online video module 155, also referred to as YouTube (trademark of Google Inc.) module 155.

Figure 4C:
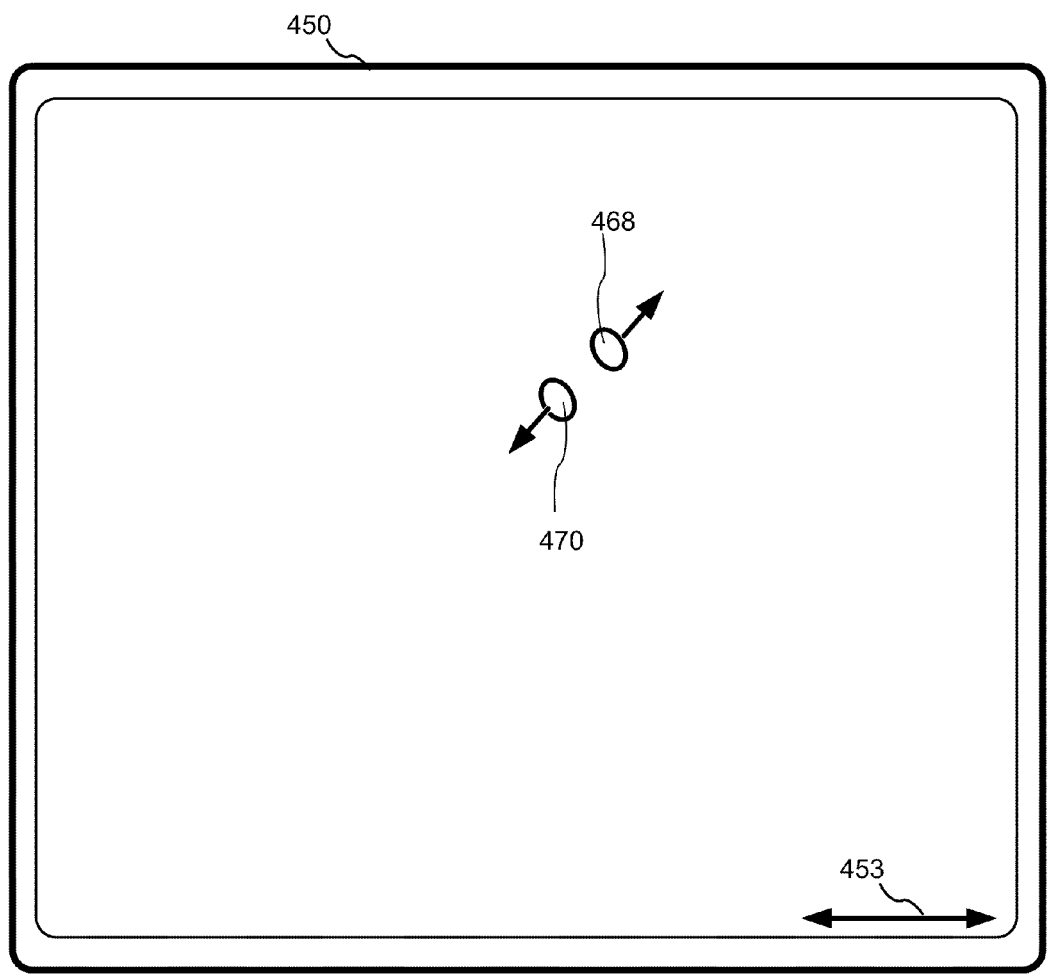
FIG. 4C illustrates an exemplary user interface for a multifunction device with a touch-sensitive surface that is separate from the display in accordance with some embodiments.
Figure 4C:
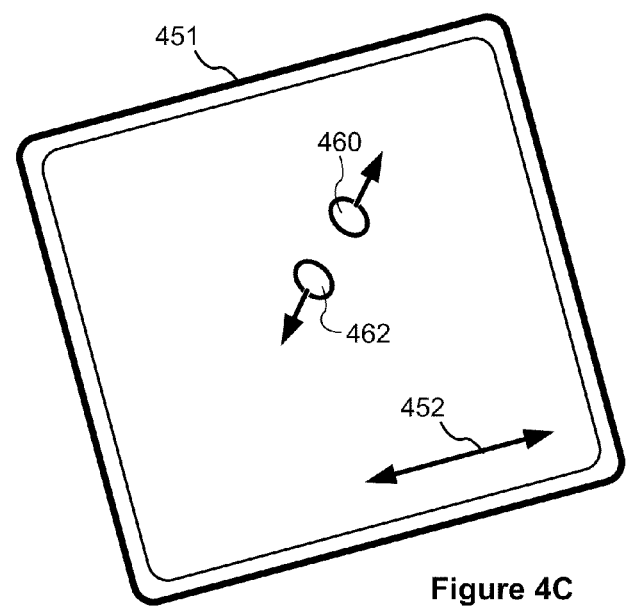

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462, and movements thereof) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a stylus input).

In the descriptions provided below, the term "contact" (except when used to describe an entry in a contact list, address book or the like) is used as a short hand term for "touch gesture," and thus each contact mentioned or described below may be any suitable touch gesture detected by a sensor (or set of sensors) of a touch-sensitive display or other touch-sensitive surface. Similarly, each "finger tap" mentioned or described below may be any suitable touch gesture. Furthermore, in some embodiments, "touch gestures" include not only gestures, made by one or more fingers or one or more styluses, that make physical contact a touch-sensitive screen 112 or other touch-sensitive surface, but also gestures that occur, in whole or in part, sufficiently close to touch-sensitive screen 112 or other touch-sensitive surface that the one or more sensors of touch-sensitive screen 112 or other touch-sensitive surface are able to detect those gestures.

Device 100 or 300 can be rotated about an axis normal (perpendicular) to the plane of the display (e.g., touch screen 112) from landscape orientation to portrait orientation, or vice versa. When the device is rotated, a user interface displayed on the display of the device can be transformed to accommodate the change in orientation. The transformation can include various transitions, such as fading in or out, and adjustments to the user interface, such as stretching, scaling, and re-wrapping, for example. Examples of user interface transitions and transformations during device rotation are disclosed in U.S. patent application Ser. No. 12/473,846, titled "Rotation Smoothing of a User Interface," filed May 28, 2009, which is incorporated by reference herein in its entirety.

Attention is now directed towards embodiments of user interfaces ("UI") and associated processes that may be implemented on a multifunction device with a display and a touch-sensitive surface, such as device 300 or portable multifunction device 100.

Figure 5A:
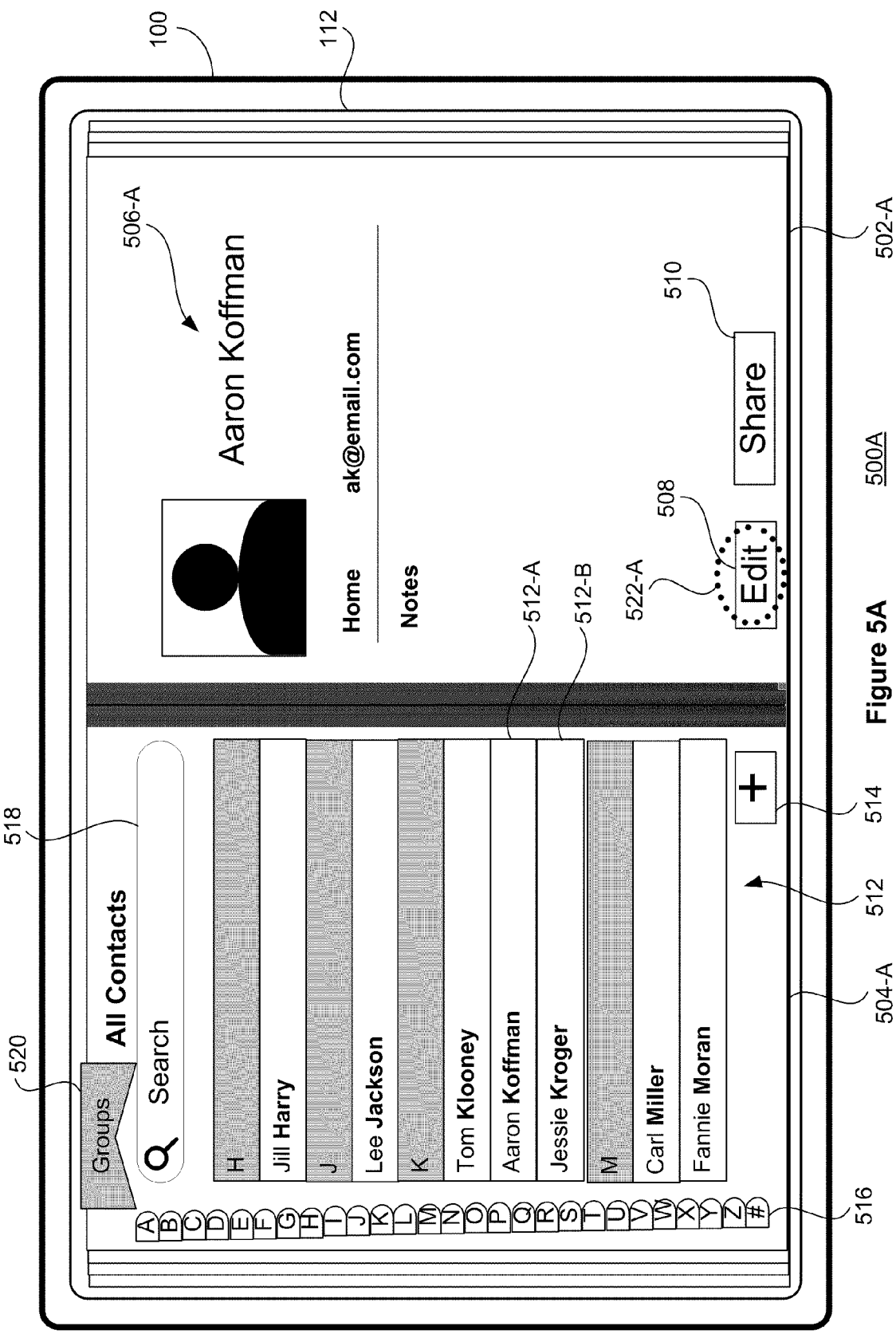
FIGS. 5A-5R illustrate exemplary user interfaces for modifying a multi-column application in accordance with some embodiments.
Figure 5B:
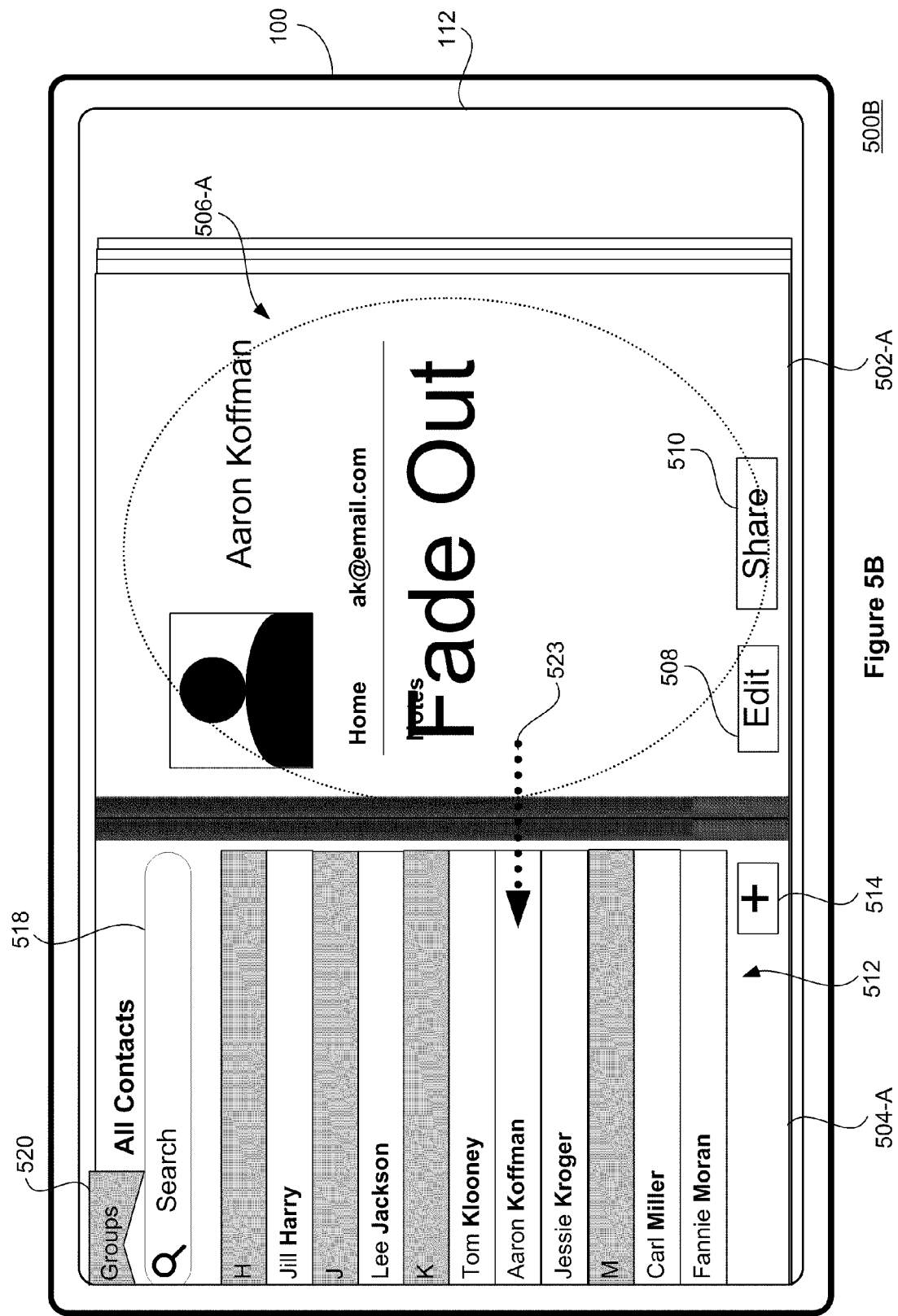
Figure 5C:
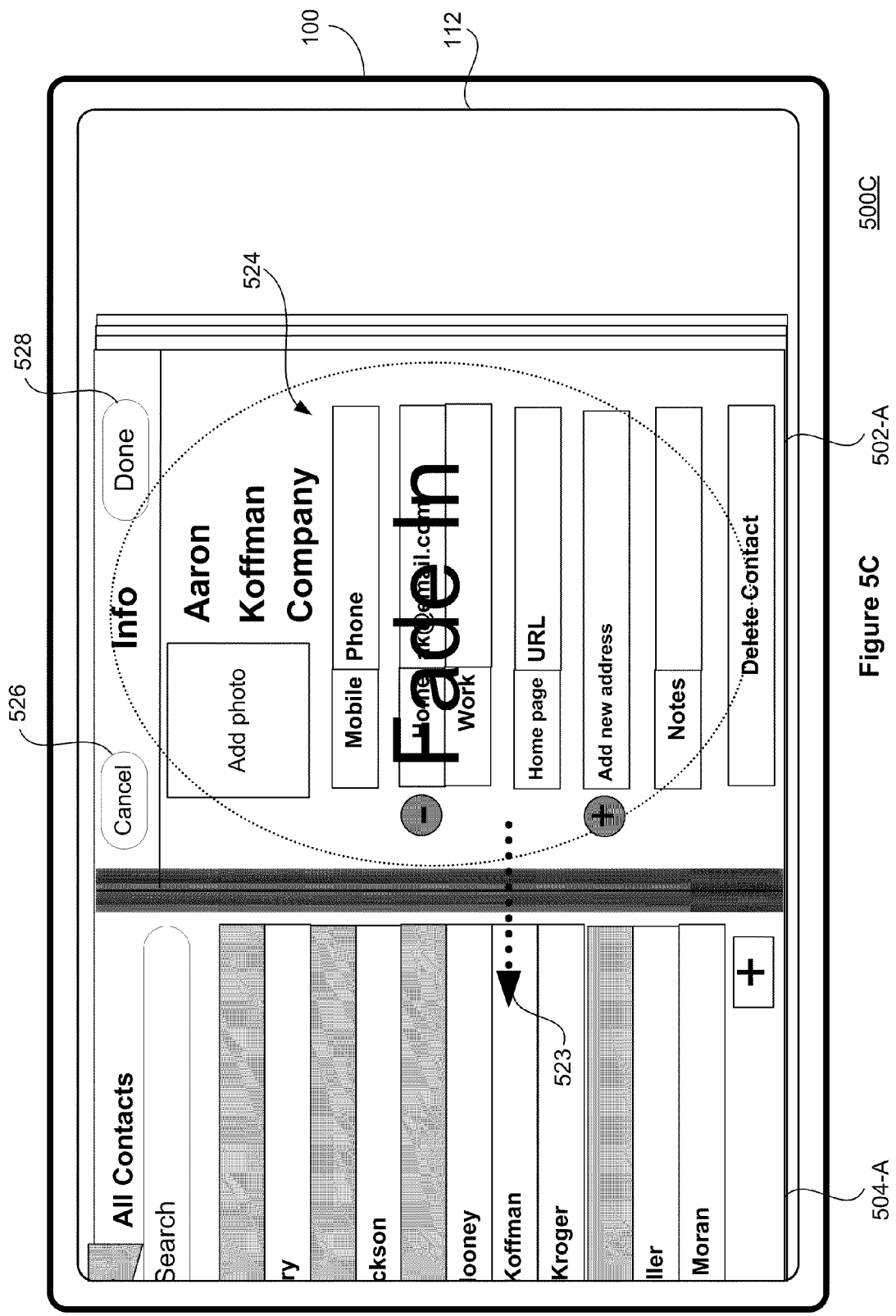
Figure 5D:
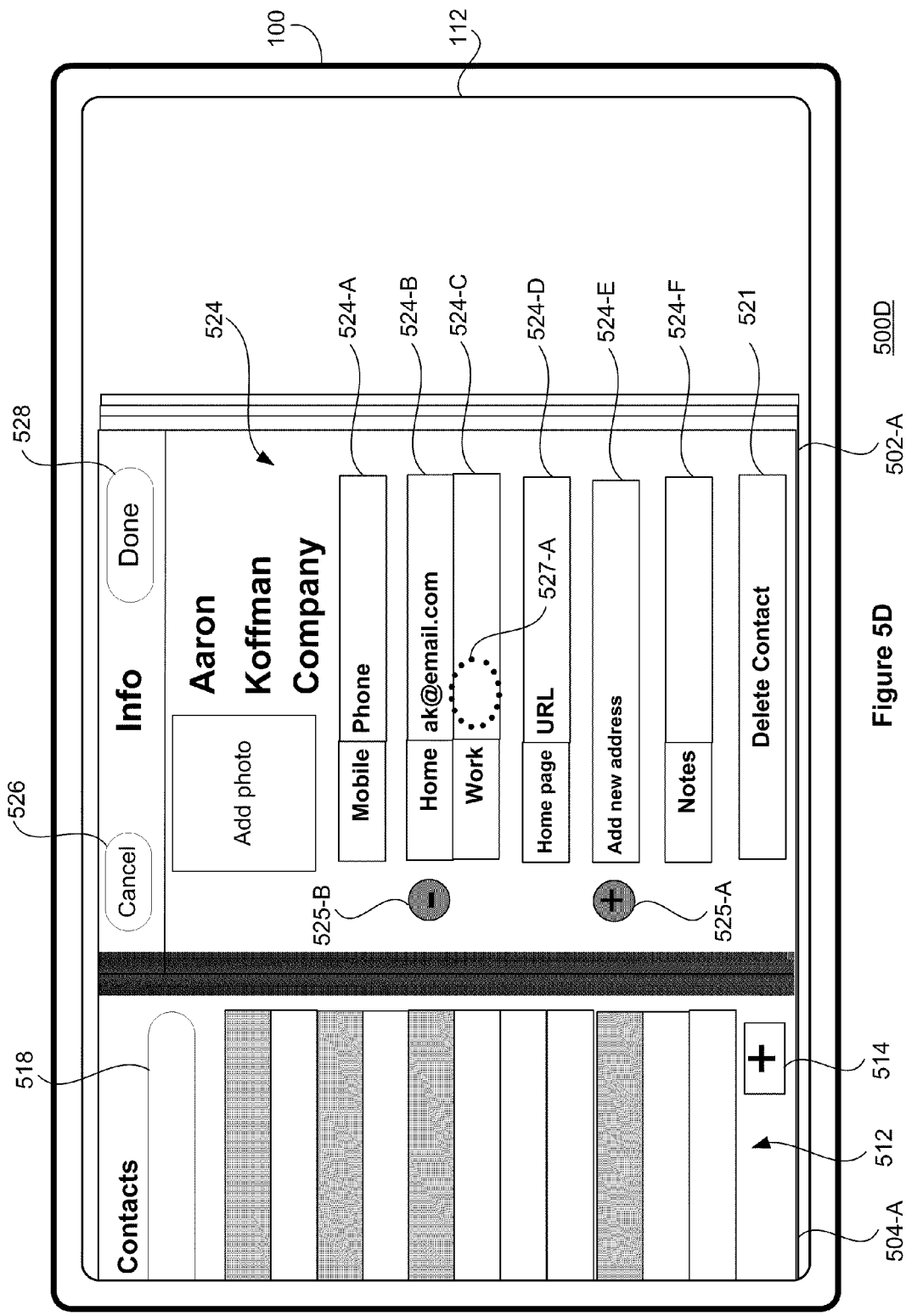
Figure 5E:
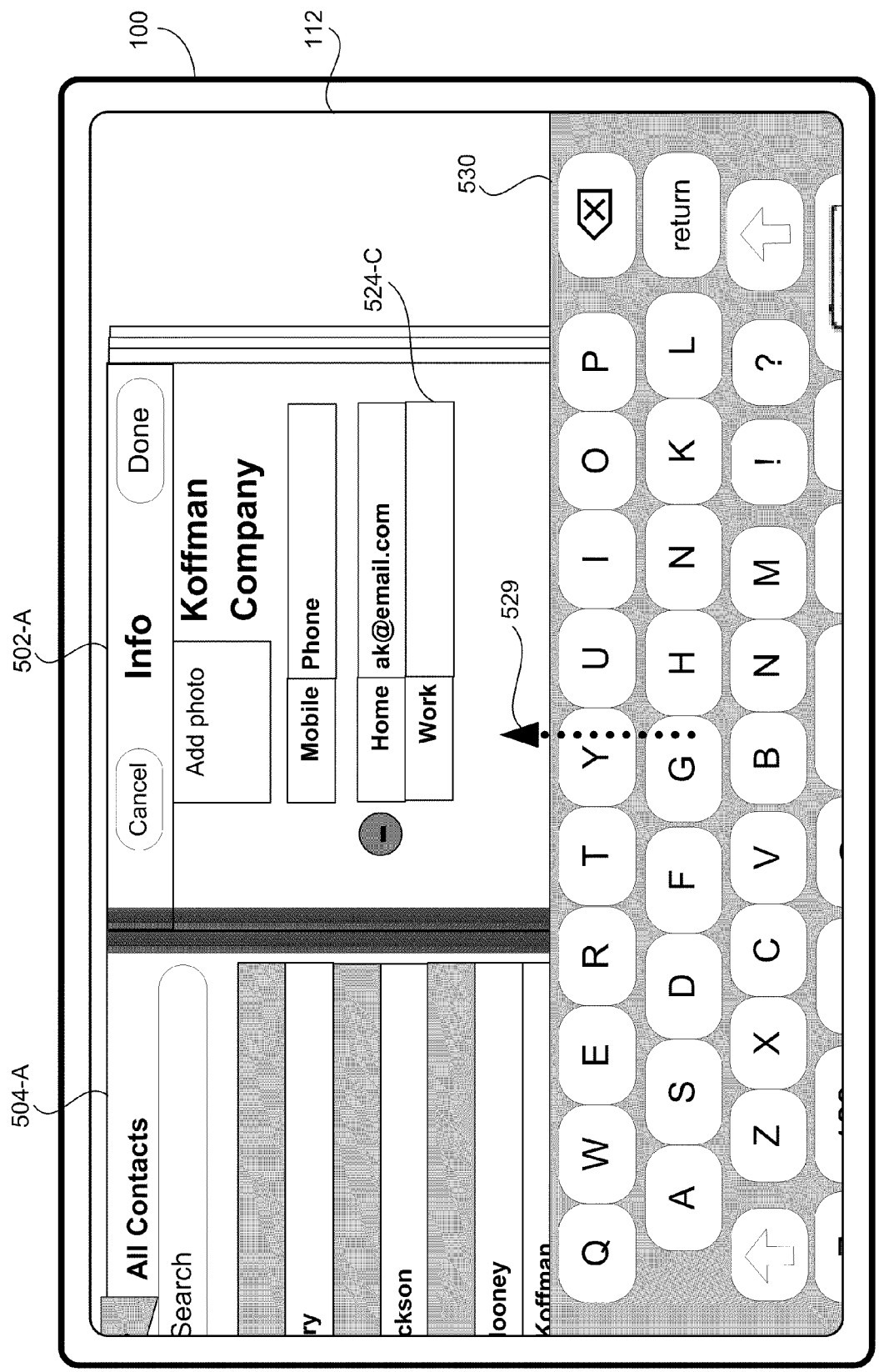
Figure 5G:
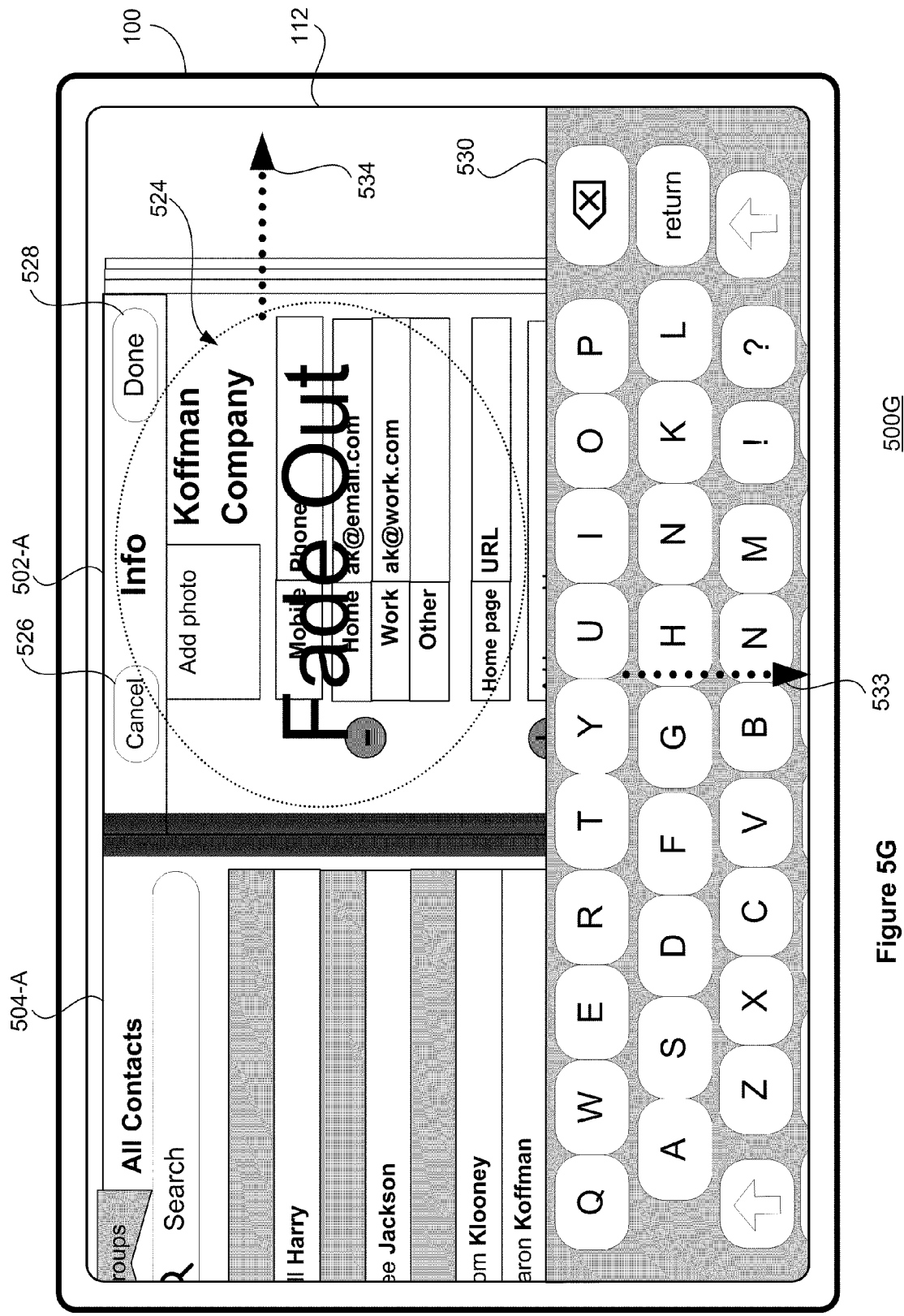
Figure 5H:
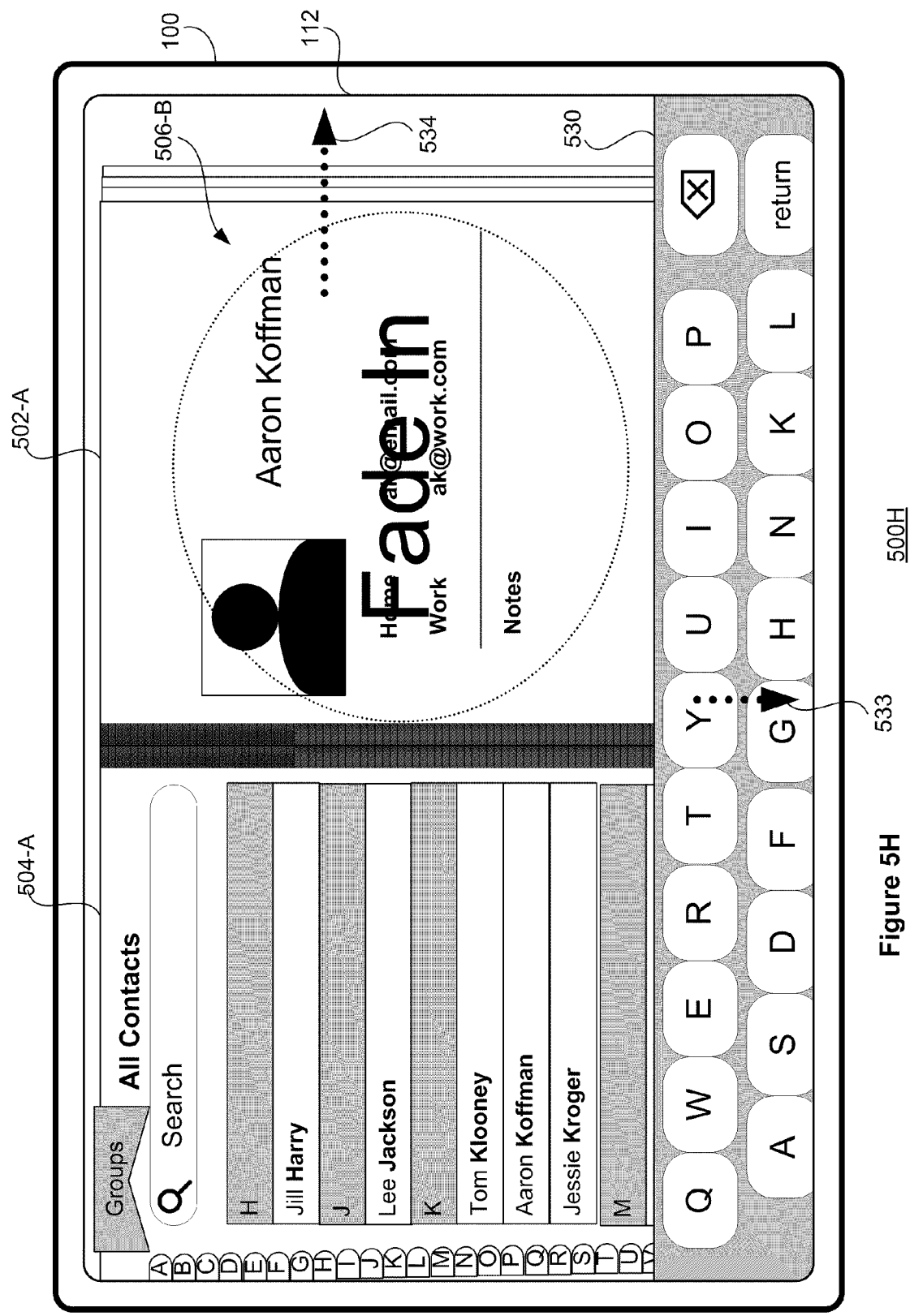
Figure 5I:
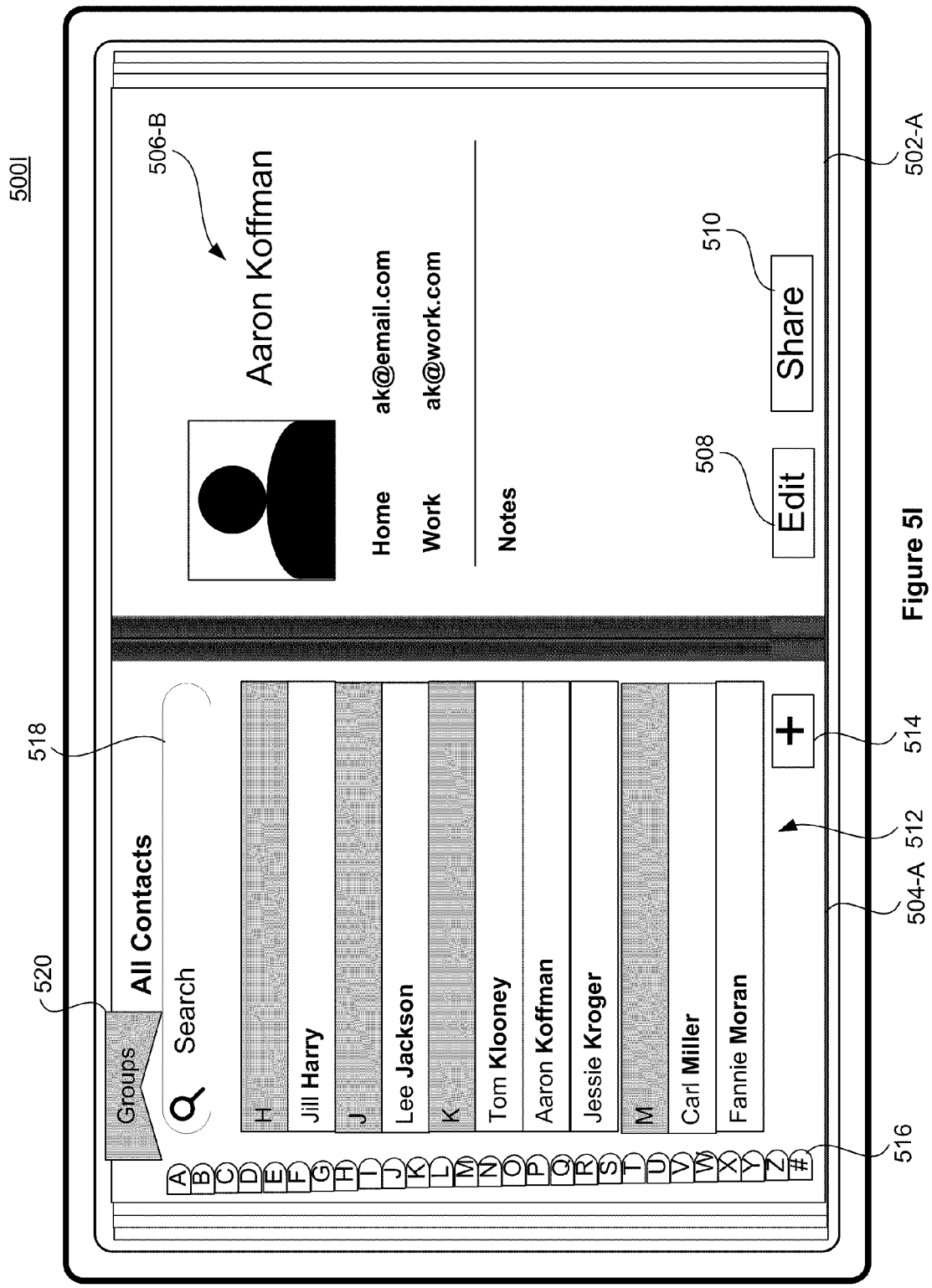
Figure 5J:
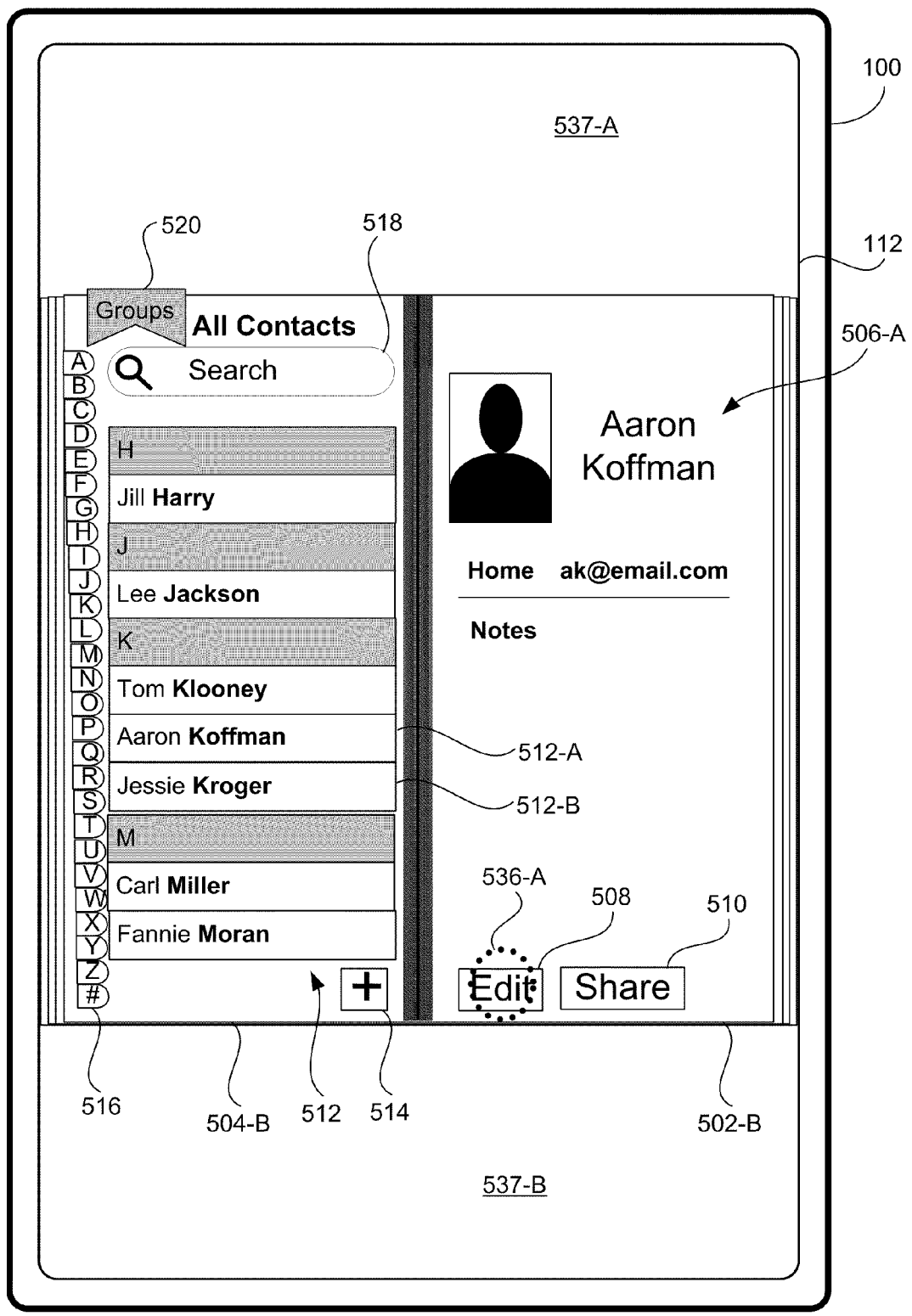
Figure 5K:
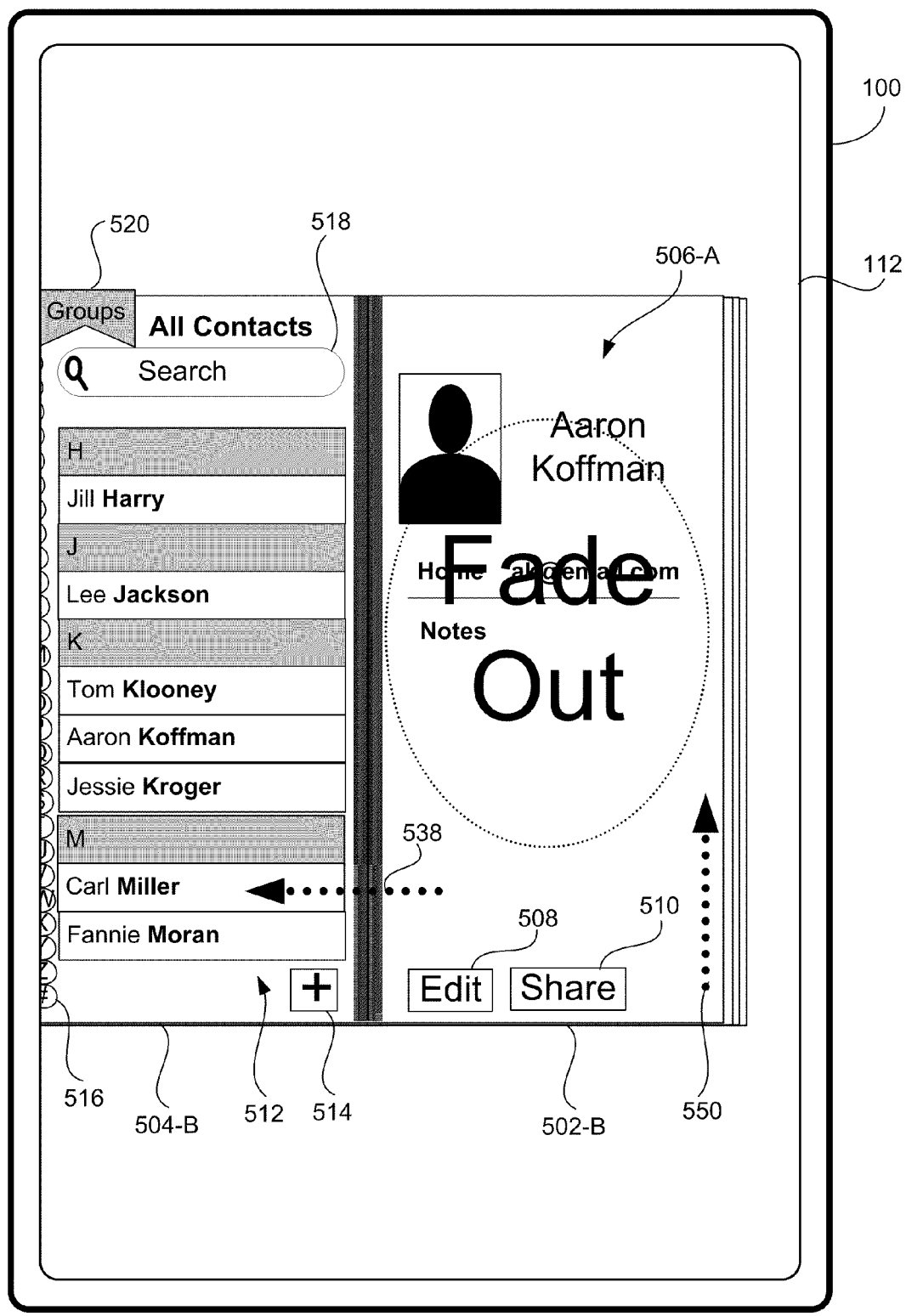
Figure 5L:
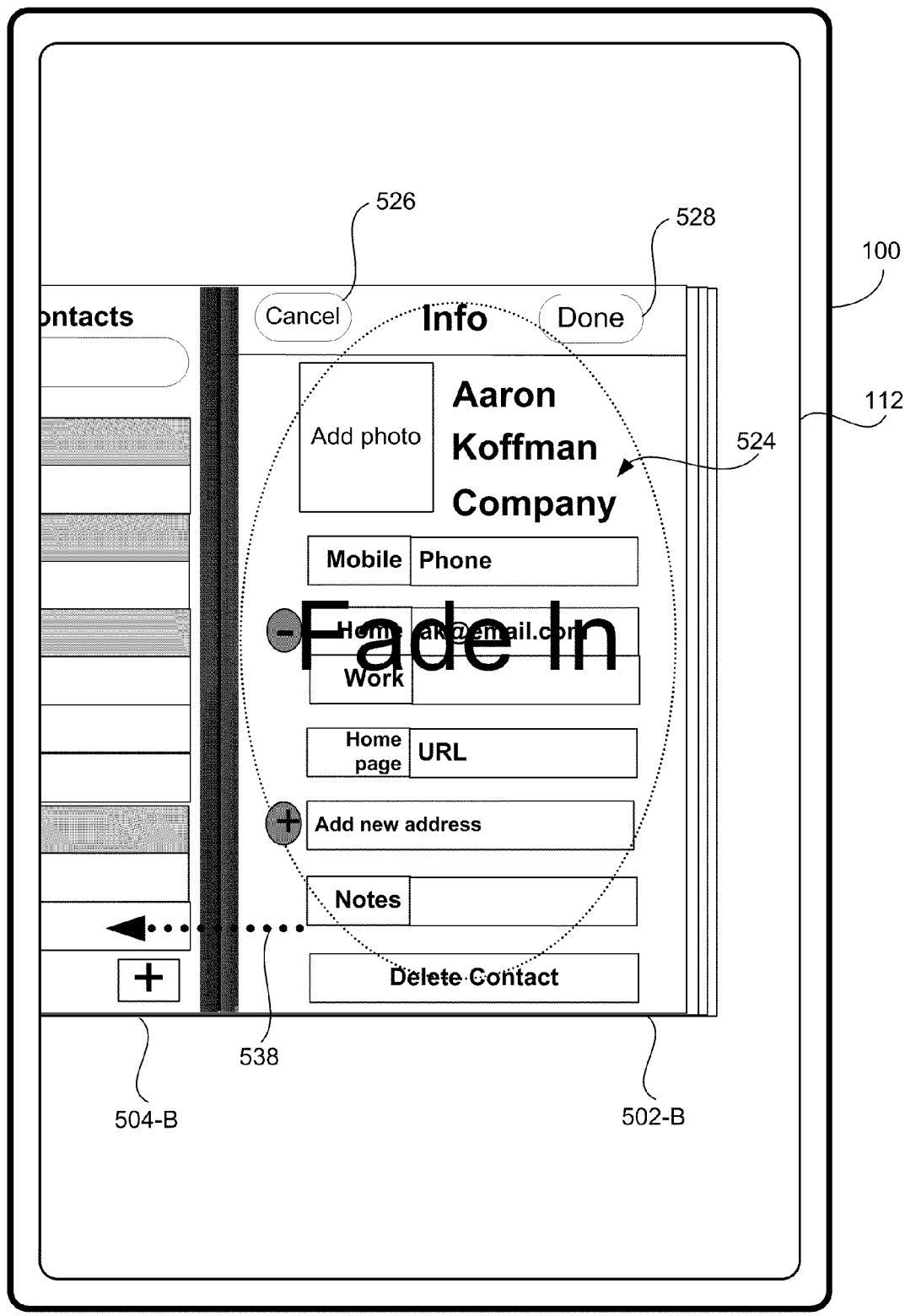
Figure 5M:
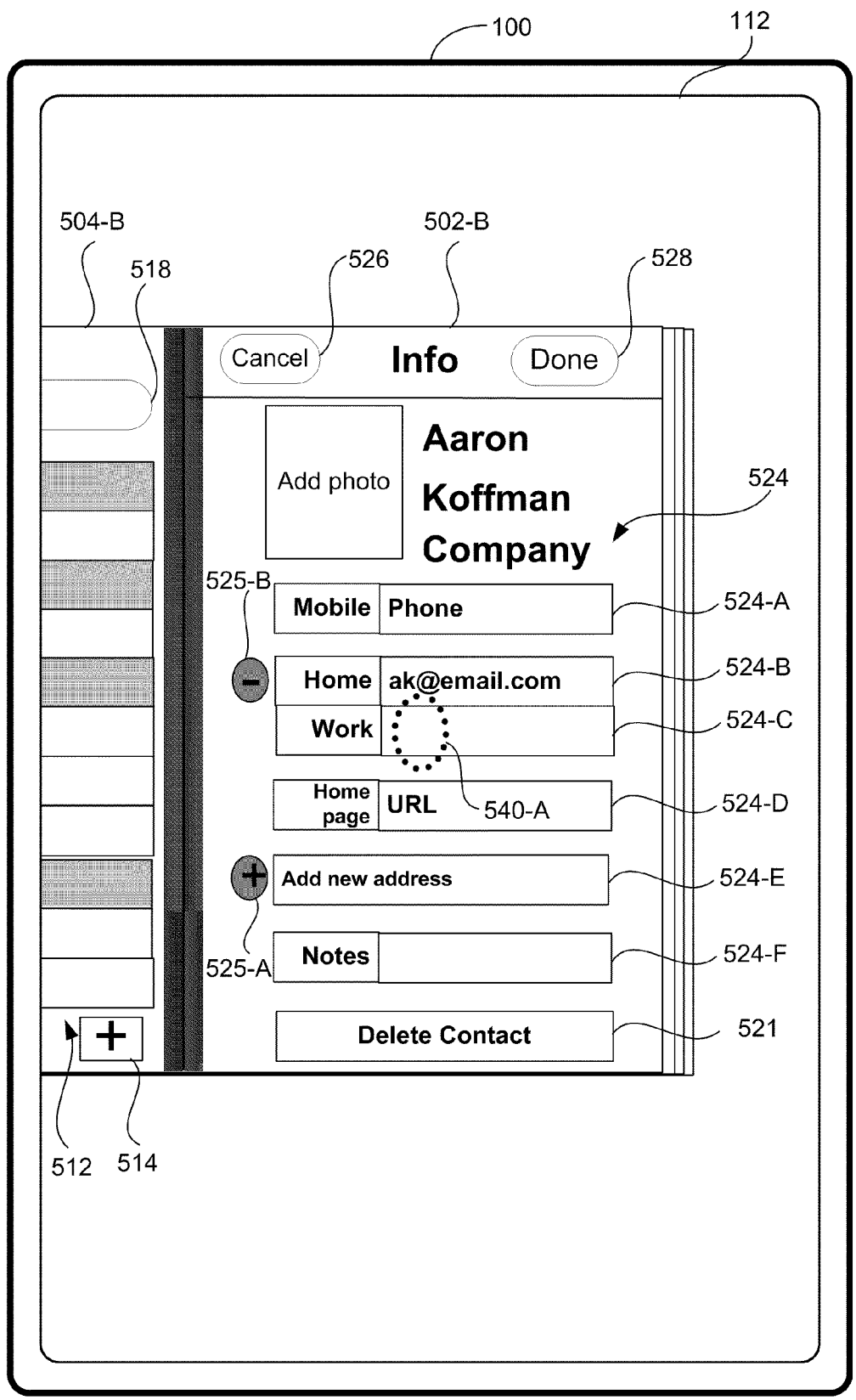
Figure 5O:
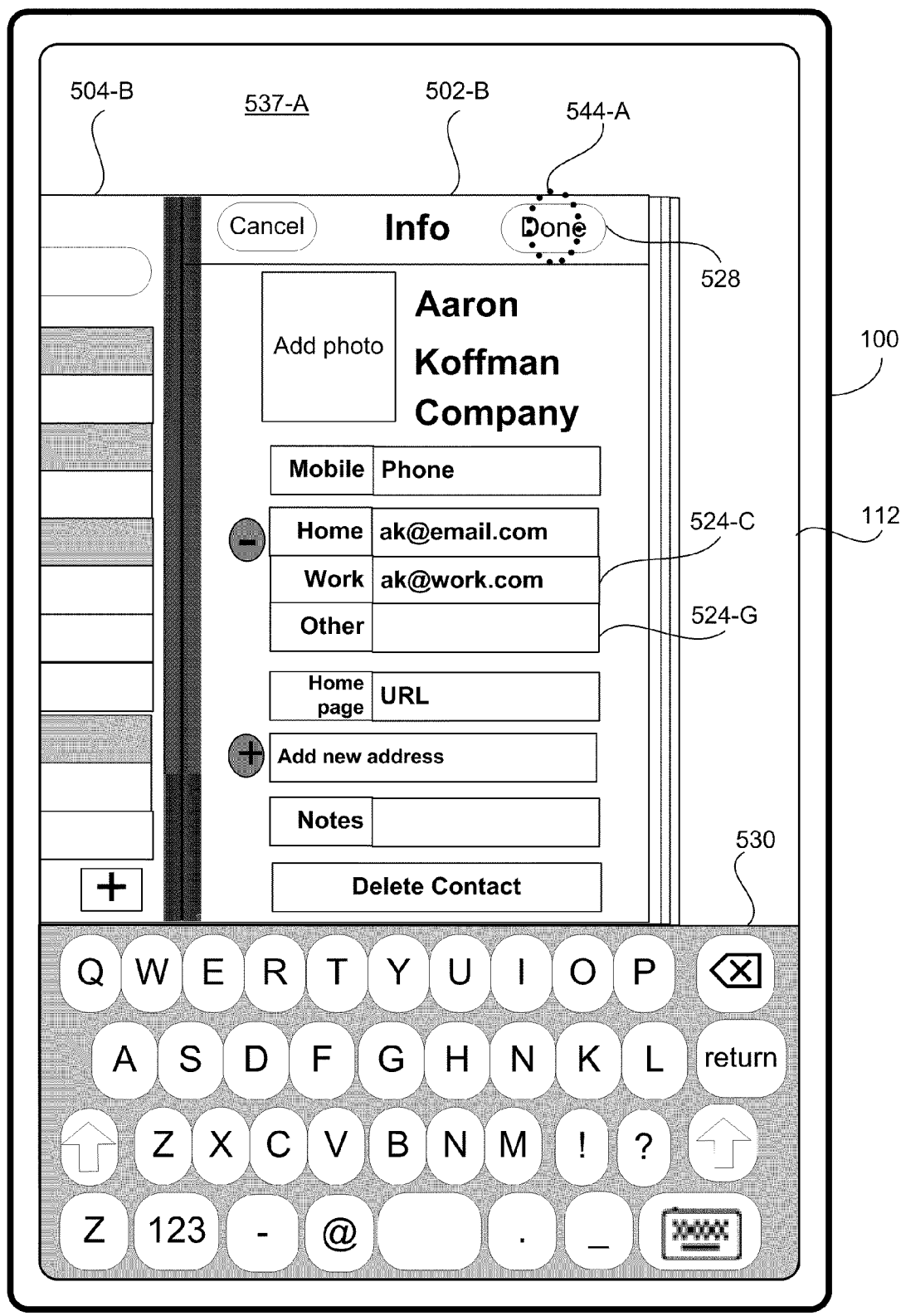
Figure 5P:
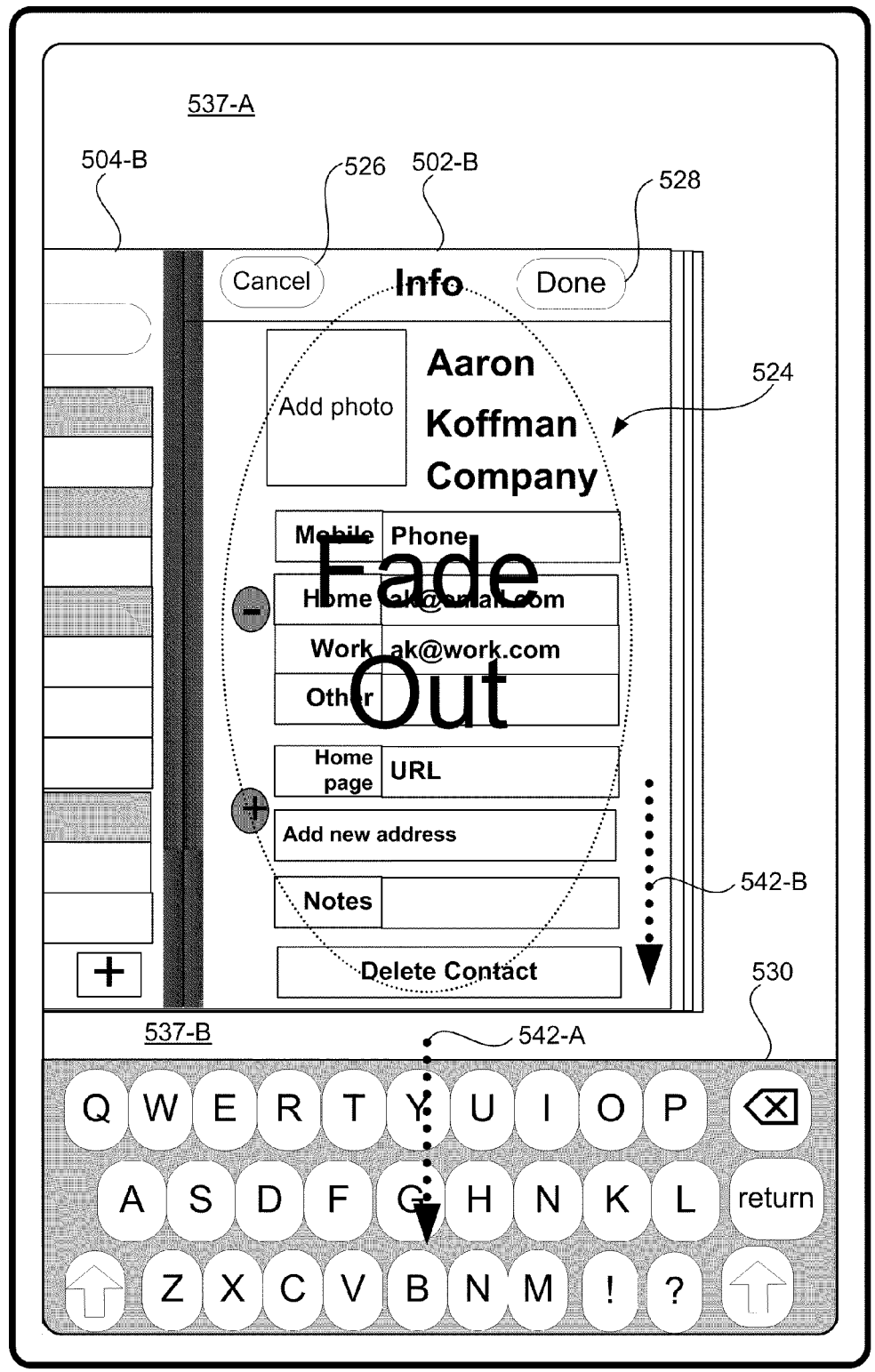
Figure 5Q:
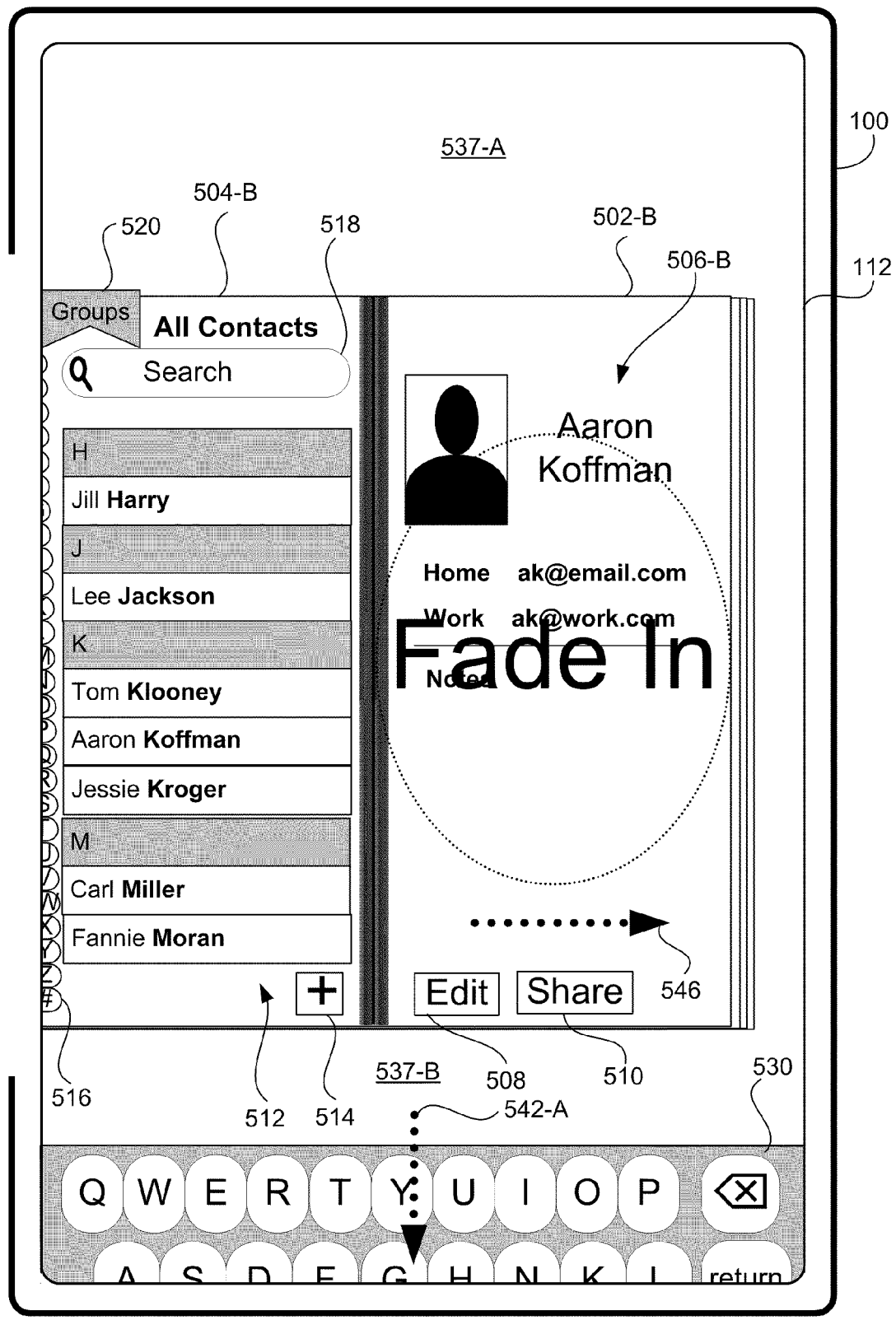
Figure 5R:
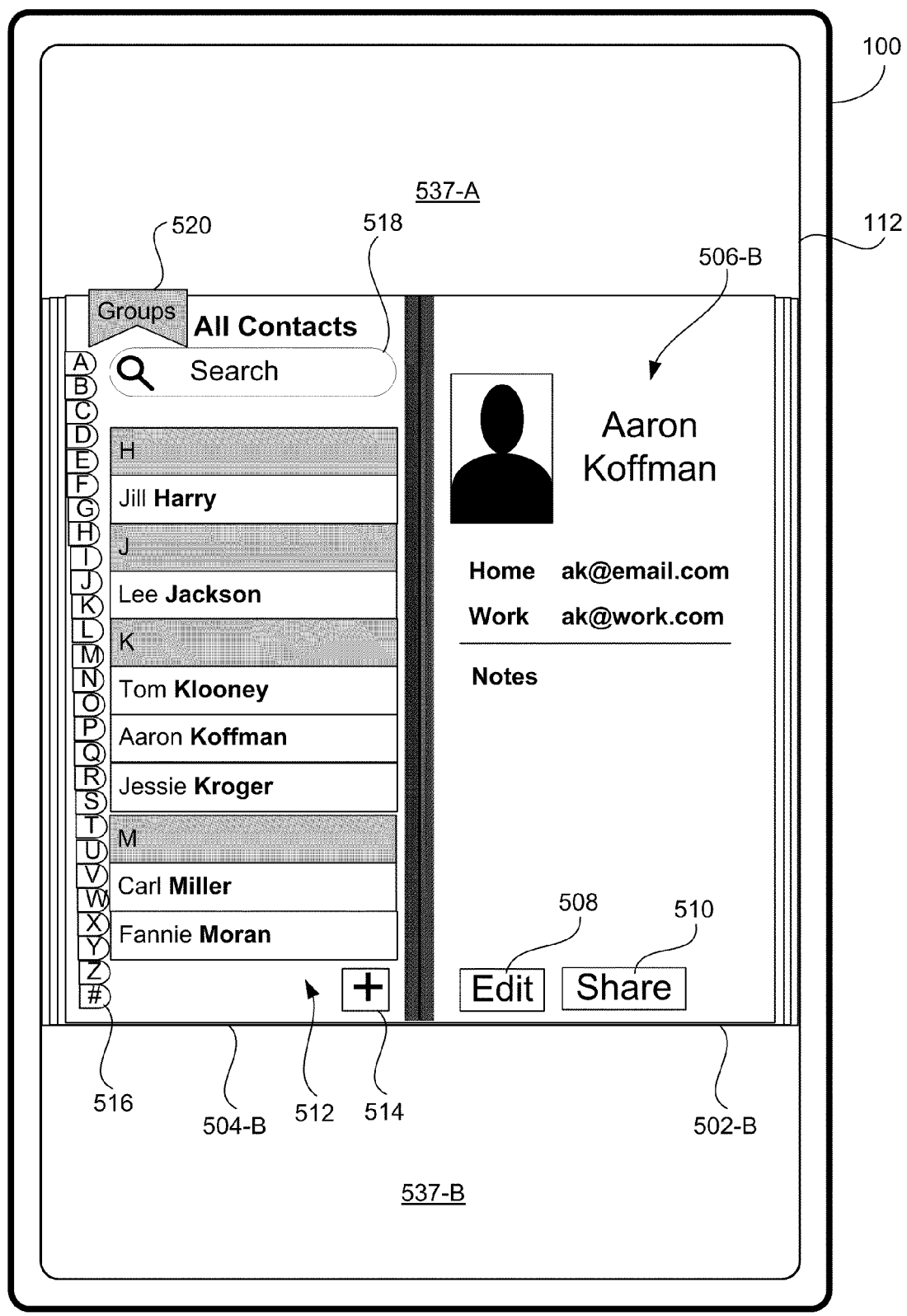
Figure 6B:
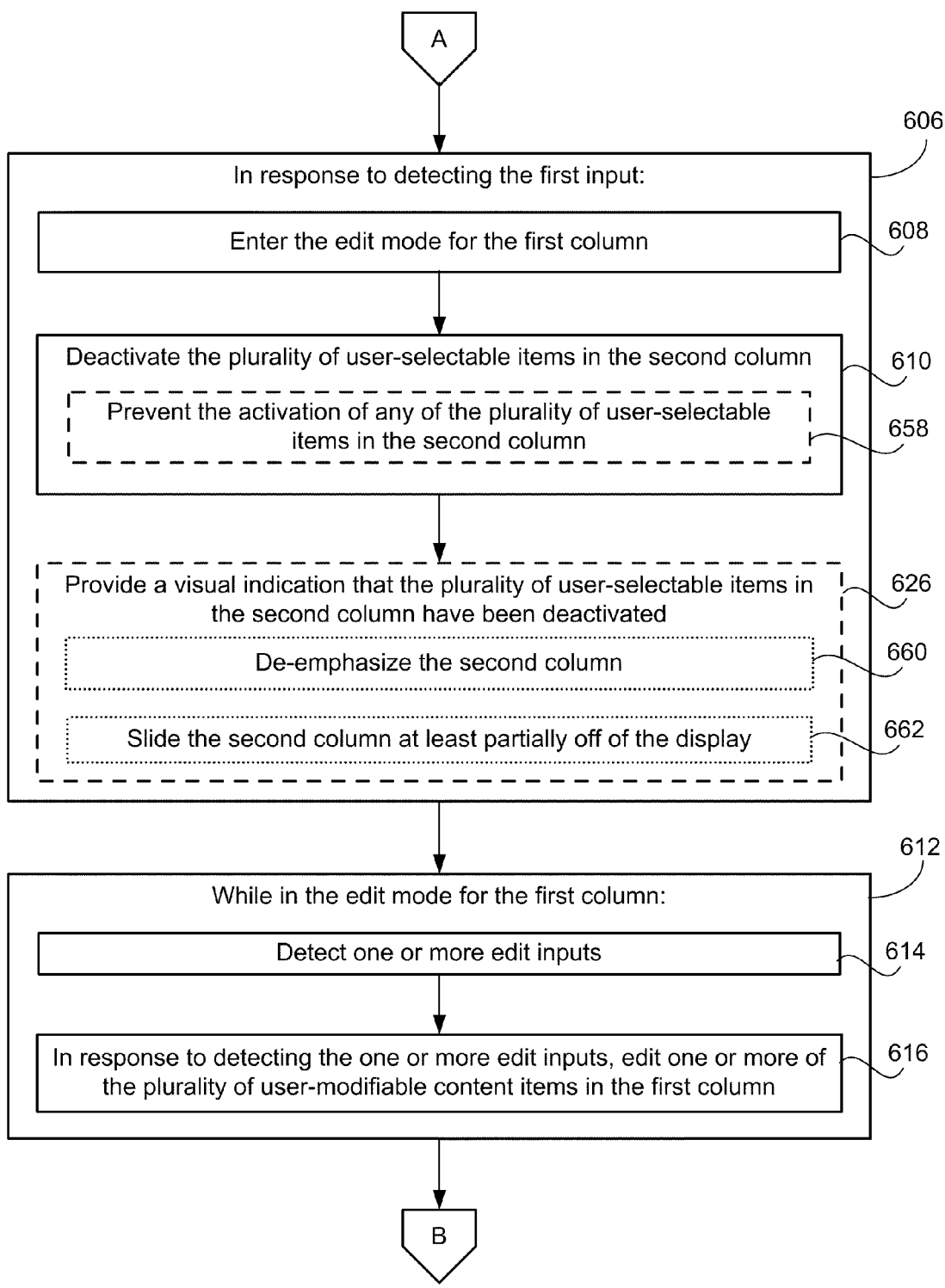
Figure 6C:
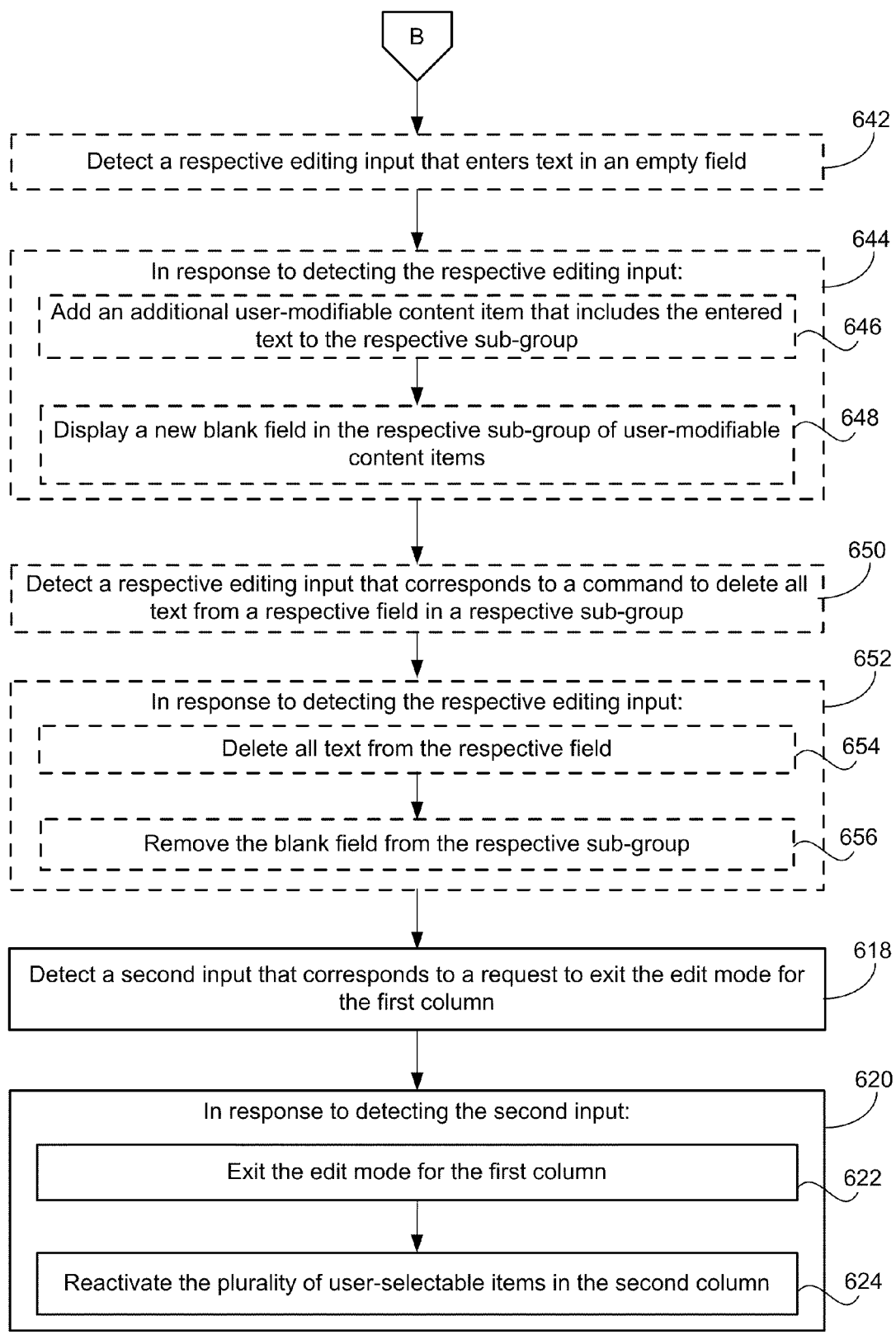

FIGS. 5A-5R illustrate exemplary user interfaces for modifying a multi-column application in accordance with some embodiments. The user interfaces in these figures are used to illustrate the processes described below, including the processes in FIGS. 6A-6E and 7A-7C.

UI 500A (FIG. 5A) depicts a user interface for a contact list application (e.g., contacts module 137) displayed in landscape orientation on a display (e.g., touch screen 112) of a device (e.g., device 100), with the touch screen 112 in landscape orientation. Displayed simultaneously in the user interface of the application are a contact information column (in landscape orientation) 502-A and a contacts column (in landscape orientation) 504-A. The columns 502-A and 504-A are displayed as adjacent pages, as in a book. The contact information column 502-A displays contact information 506-A (which includes one or more user-modifiable items, such as name, phone number, address, email address, notes, etc.) for a particular contact. The contact information 506-A is scrollable, e.g., with a touch gesture, for viewing long entries. The contact information column 502-A also includes an edit button 508 for activating an edit mode to modify the contact information 506-A and a share button 510 for sharing the contact information 506-A with another device.

Contacts column 504-A displays a list of contact names 512. The contacts column 504-A also includes an add contact button 514 for adding a new contact, alphabetical/numerical tabs 516 for jumping to contacts having a name that starts with a particular letter or with a number, if any, a search field 518 for searching the contacts list, and a groups tab 520 for viewing the contacts organized by groups (e.g., business contacts, family, friends, etc.) as opposed to a strictly alphabetical ordering. A user can select a contact name 512 (e.g., 512-A, 512-B) in column 504-A to have the selected contact's contact information 506-A displayed in the contact information column 502-A. For example, contact information 506-A shows the contact information for the contact with the contact name 512-A. Optionally, a contact name 512 (e.g., 512-A, 512-B) is editable from within column 504-A.

A contact (i.e., a touch gesture) on the touch screen 112 at a location 522-A corresponding to edit button 508 can be detected. In response to detecting the contact, the contact list application enters into edit mode. UI 500B (FIG. 5B) depicts the contact list application entering into edit mode. The columns 502-A and 504-A move (e.g., slide) across the touch screen 112 in the direction indicated by arrow 523; column 504-A moves at least partially off the touch screen 112 and column 502-A moves toward the center of the touch screen 112. The contact names 512, button 514, tabs 516 and 520, and search field 518 in column 504-A are deactivated, and thus unavailable for selection or use by users. Contact information 506-A and buttons 508, 510 fade out of view as they move toward the center of the touch screen 112. In some embodiments, column 504-A dims as it moves at least partially off of the touch screen 112. In some embodiments, the contact list application also enters edit mode in response to detection of a contact at a location corresponding to add contact button 514.

UI 500C (FIG. 5C) depicts the contact list application as it continues to enter into edit mode. Columns 502-A and 504-A continue to move in the direction indicated by arrow 523. In column 502-A, edit fields 524 for the contact information, a cancel button 526, and a done button 528 fade into view as column 502-A moves toward the center of the touch screen 112.

UI 500D (FIG. 5D) depicts a user interface for the contact list application in edit mode. Column 504-A is partially off of the touch screen 112. Contact names 512, button 514, tabs 516 and 520, and search field 518 in column 504-A are deactivated. Column 502-A is approximately centered on the touch screen 112. Displayed in column 502-A are one or more edit fields 524, a delete contact button 521, a cancel button 526, and a done button 528. Edit fields 524 allow a user to enter or modify contact information 506-A for a contact. Examples of edit fields 524 include edit fields for mobile phone number 524-A, home email address 524-B, work email address 524-C, home page 524-D, address (e.g., mailing address or geographic address) 524-E, and notes 524-F. Delete contact button 521 can be used to delete a contact entirely. Cancel button 526 can be used to discard any changes made and to exit edit mode. Done button 528 can be used to save any changes made and to exit edit mode. An edit field 524 can be selected in order to modify the information in that field. For example, a user can make contact at location 527-A corresponding to edit field 524-C, and if the contact is detected by the device 100, the user can proceed to modify the work email address. Also displayed in column 502-A are an add field button 525-A for adding an additional field (e.g., an additional address or email address) and a subtract field button 525-B for removing a field (e.g., removing a respective address or email address).

UI 500E (FIG. 5E) depicts a user interface transitioning, in response to the aforementioned contact at location 527-A (FIG. 5D), to a mode where the work email address can be modified in edit field 524-C. A soft keyboard 530 is moved in the direction indicated by arrow 529. Soft keyboard 530 obscures a portion of columns 502-A and 504-A, including some edit fields 524. In some embodiments, column 502-A can be moved (e.g., by dragging the column using a touch gesture on touch screen 112) to access edit fields 524 that are obscured by the soft keyboard 530.

UI 500F (FIG. 5F) depicts a user interface where the work email address can be modified in edit field 524-C. Soft keyboard 530 is displayed on the touch screen 112 and obscures a portion of columns 502-A and 504-A, including some edit fields 524. In some embodiments, column 502-A can be moved (e.g., by dragging the column using a touch gesture on touch screen 112) to access edit fields 524 that are obscured by soft keyboard 530. When the user has completed modifying the information in edit field 524-C, the modifications can be saved by hitting (i.e., performing a touch gesture or other gesture on) done button 528. For example, a contact is detected at a location 532-A corresponding to done button 528. In response to detection of the contact at location 532-A, any changes made in email address 524-C, as well as in other edit fields 524, are saved and the contact list application exits edit mode.

UI 500G (FIG. 5G) depicts the contact list application exiting edit mode. The soft keyboard 530 moves (e.g., slides) out of view in the direction indicated by arrow 533. The columns 502-A and 504-A move on the touch screen 112 in the direction indicated by arrow 534; column 502-A moves off the center of the touch screen 112 and column 504-A moves so that the portion of column 504-A that was out of view moves back into view. The user interface components displayed in column 502-A in edit mode (edit fields 524, cancel button 526, done button 528, etc.) are deactivated and fade out as column 502-A moves on the touch screen 112.

UI 500H (FIG. 5H) depicts the contact list application continuing to exit from edit mode. Soft keyboard 530 continues to move out of view in the direction indicated by arrow 533. Columns 502-A and 504-A continue to move on touch screen 112 in the direction indicated by arrow 534. In column 502-A, contact information 506-B (the contact information 506-A after modification in edit mode) and other user interface components (e.g., edit button 508, share button 510) fade in.

UI 500I (FIG. 5I) depicts the contact list application out of edit mode. Columns 504-A and 504-A are back at their original locations. The user interface components in column 504-A (e.g., contact names 512, add contact button 514, alphabet tabs 516, search field 518, groups tab 520) are reactivated. In column 502-A, contact information 506-B is displayed, and edit button 508 and share button 510 are displayed.

UI 500J (FIG. 5J) depicts a user interface for a contact list application displayed in portrait orientation on touch screen 112 of device 100, with touch screen 112 in portrait orientation. Displayed simultaneously in the user interface of the application are a contact information column (in portrait orientation) 502-B and a contacts column (in portrait orientation) 504-B. Above and below columns 502-B and 504-B within the touch screen 112 are unoccupied regions 537-A and 527-B respectively. Contact information column 502-B displays user-modifiable contact information 506-B (e.g., name, phone number, address, email address, notes, etc.) for an individual contact. Contact information column 502-B also includes an edit button 508 for entering into an edit mode to modify contact information 506-A and a share button 510 for sharing contact information 506-A with another device. In some embodiments, columns 502-B and 504-B are transformed (e.g., stretched, rescaled, etc.) from columns 502-A and 504-A, respectively, in response to detection of a rotation of device 100 (and thus a rotation of touch screen 112) from landscape orientation to portrait orientation. Examples of transformations in response to device rotation are disclosed in U.S. patent application Ser. No. 12/473,846, titled "Rotation Smoothing of a User Interface," which was incorporated by reference in its entirety above.

Contacts column 504-B displays a list of contact names 512. The contacts column 504-B also includes an add contact button 514 for adding a new contact, alphabetical/numerical tabs 516 for jumping to contacts having a name that starts with a particular letter or with a number, if any, a search field 518 for searching the contacts list, and a groups tab 520 for viewing the contacts organized by groups (e.g., business contacts, family, friends, etc.) as opposed to a strictly alphabetical ordering. A user can select a contact name 512 (e.g., 512-A, 512-B) in column 504-B to have the selected contact's contact information 506-A displayed in contact information column 502-B. For example, contact information 506-A shows the contact information for contact name 512-A. Optionally, a contact name 512 (e.g., 512-A, 512-B) is editable from within column 504-B.

Device 100 is configured to detect a contact on touch screen 112 at a location 536-A corresponding to edit button 508, using the hardware and methods discussed above. In response to detecting the contact at location 536-A, the contact list application enters into edit mode. UI 500K (FIG. 5K) depicts the contact list application entering into edit mode. The columns 502-B and 504-B move (e.g., slide) across the touch screen 112 in the direction indicated by arrow 538; column 504-B moves at least partially off the touch screen 112 and column 502-B moves toward the center of the touch screen 112. The contact names 512, button 514, tabs 516 and 520, and search field 518 are deactivated, and are therefore unavailable for selection or use by users. Contact information 506-A and buttons 508, 510 fade out of view as they move toward the center of the touch screen 112. In some embodiments, column 504-B dims as it moves at least partially off of the touch screen 112.

UI 500L (FIG. 5L) depicts the contact list application as it continues to enter into edit mode. Columns 502-B and 504-B continue to move in the direction indicated by arrow 538. In column 502-B, edit fields 524 for the contact information, a cancel button 526, and a done button 528 fade into view as column 502-B moves toward the center of the touch screen 112.

UI 500M (FIG. 5M) depicts a user interface for the contact list application in edit mode. Column 504-B is partially off of the touch screen 112. Contact names 512, button 514, tabs 516 and 520, and search field 518 in column 504-B are deactivated. Column 502-B is approximately centered on the touch screen 112. Displayed in column 502-B are one or more edit fields 524, a delete contact button 521, a cancel button 526, and a done button 528. Edit fields 524 allow a user to modify contact information 506-A stored in the device for a contact. Examples of edit fields 524 include edit fields for mobile phone number 524-A, home email address 524-B, work email address 524-C, home page 524-D, address (e.g., mailing address or geographic address) 524-E, and notes 524-F. Delete contact button 521 can be used to delete a contact entirely. Cancel button 526 can be used to discard any changes made and to exit edit mode. Done button 528 can be used to save any changes made and to exit edit mode. An edit field 524 can be selected in order to modify the information in that field. For example, a user can make contact at location 540-A corresponding to edit field 524-C, and when the contact is detected by the device 100, the user can proceed to modify the work email address. Also displayed in column 502-A are an add field button 525-A for adding an additional field to a sub-group of contact information (e.g., an additional address or email address) and a subtract field button 525-B for removing a field from a sub-group of contact information (e.g., removing an extraneous address or email address).

UI 500N (FIG. 5N) depicts a user interface transitioning to a mode where the work email address can be modified in edit field 524-C. A soft keyboard 530 is moved in the direction indicated by arrow 541-A to occupy region 537-B. Columns 502-B and 504-B move in the direction indicated by arrow 541-B toward region 537-A so that soft keyboard 530 does not obscure either column as soft keyboard 530 moves into view.

UI 500O (FIG. 5O) depicts a user interface where the work email address can be modified in edit field 524-C. Soft keyboard 530 is displayed on the touch screen 112 and occupying former region 537-B, allowing the user to input and delete characters in the edit field 524-C. Columns 502-B and 504-B occupy at least a portion of region 537-A. Soft keyboard 530 does not obscure any part of columns 502-B or 504-B. When the user has completed modifying the information in edit field 524-C, the modifications can be saved by hitting (e.g., performing a touch gesture or other gesture on) done button 528. For example, a contact is detected at a location 544-A corresponding to done button 528. In response to detection of the contact at location 544, any changes made in email address 524-C, as well as in other edit fields 524, are saved and the contact list application exits edit mode.

UI 500P (FIG. 5P) depicts the contact list application exiting edit mode. Soft keyboard 530 moves (e.g., slides) out of view in the direction indicated by arrow 542-A, un-occupying region 537-B. The columns 502-B and 504-B move on the touch screen 112 in the direction indicated by arrow 542-B, un-occupying region 537-A; column 502-B moves off of the center of the touch screen 112 and column 504-B moves so that the portion of the column 504-B that was out of view moves back into view. The user interface components displayed in column 502-B in edit mode (edit fields 524, cancel button 526, done button 528, etc.) are deactivated and fade out as column 502-B moves on the touch screen 112.

UI 500Q (FIG. 5Q) depicts the contact list application continuing to exit from edit mode. Soft keyboard 530 continues to move out of view in the direction indicated by arrow 542A. Columns 502-B and 504-B move in the direction indicated by arrow 546. In column 502-B, contact information 506-B (the contact information 506-A after modification in edit mode) and other user interface components (e.g., edit button 508, share button 510) fade in.

UI 500R (FIG. 5R) depicts the contact list application out of edit mode. Columns 502-B and 504-B are back at their original locations, out of region 537-A. Region 537-B is unoccupied. The user interface components in column 504-B (e.g., contact names 512, add contact button 514, alphabet tabs 516, search field 518, groups tab 520) are reactivated. In column 502-B, contact information 506-B is displayed, and edit button 508 and share button 510 are displayed.

FIGS. 6A-6E are flow diagrams illustrating a method 600 of modifying a multi-column application in accordance with some embodiments. Method 600 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, method 600 provides an intuitive way to modify a multi-column application. The method reduces the cognitive burden on a user when modifying a multi-column application, thereby creating a more efficient human-machine interface. For battery-operated computing devices, enabling a user to work with the applications faster and more efficiently conserves power and increases the time between battery charges.

The device displays (602) simultaneously a plurality of columns in a multi-column application that comprises: a first column that includes a plurality of user-modifiable content items; and a second column that includes a plurality of user-selectable items. For example, in FIG. 5A, columns 502-A (the first column) and 504-A (the second column) are displayed in the user interface for a contact list application. In some embodiments, the columns are displayed as facing, opposite, or adjacent pages, as in a book. For example, columns 502-A and 504-A are displayed as adjacent pages. Column 502-A includes contact information 506-A, which includes one or more user-modifiable items. Column 504-A includes contact names 512, which are user-selectable to cause contact information for the selected contact name to be displayed in column 502-A.

In some embodiments, the plurality of user-modifiable content items is part of a group or set, such as the contact information items in contact information 506-A for a particular contact in FIG. 5A. In some embodiments, the first column includes a first set of interactive controls, such as edit button 508 and share button 510 in FIG. 5A.

In some embodiments, at least some of the user-selectable items are also user-modifiable. For example, a contact name 512 can be edited from within the first column (e.g., column 504-A) or second column (e.g., column 502-A). In some embodiments, the plurality of user-selectable items in the second column includes a second set of interactive controls, such as tabs 516 and 520, add contact button 514, and search field 518 in FIG. 5A.

The device detects (604) a first input that corresponds to a request to enter an edit mode for the first column. The first input can be, for example, a touch gesture such as a tap gesture on an edit icon or button, a stylus gesture, or a mouse click. For example, in FIG. 5A, a contact is detected at location 522-A that corresponds to edit button 508.

In response to detecting the first input (606), the device enters (608) the edit mode for the first column, and deactivates (610) the plurality of user-selectable items in the second column. The first input can be, for example, hitting an "edit" button or performing a gesture with a finger, stylus, or mouse. For example, in FIGS. 5B through 5F, column 502-A transitions into edit mode for contact information 506-A. Contact information 506-A is replaced by edit fields 524 in column 502-A. In column 504-A, contact names 512, add contact button 514, tabs 516 and 520, and search field 518 are disabled and not selectable by the user while disabled.

While in the edit mode for the first column (612), the device detects (614) one or more edit inputs, and in response to detecting the one or more edit inputs, edits (616) one or more of the plurality of user-modifiable content items in the first column. The one or more edit inputs can be, for example, hitting (i.e., touch gestures or other gestures on) the keys of a soft keyboard using a finger, stylus, or mouse, hitting the keys of a physical keyboard, or recognized handwriting. In some embodiments, prior to entering edit mode for the first column, none of the user-modifiable content items can be edited, and after entering edit mode for the first column, all of the user-modifiable content items in the first column can be edited. In some embodiments, prior to entering edit mode for the first column, at least a subset of the user-modifiable content items cannot be edited, and after entering edit mode for the first column, all of the user modifiable content items can be edited. For example, a contact's name and address(es) can only be edited in edit mode, but the "notes" content for a contact can be edited both in and out of edit mode.

For example, in FIG. 5F, the device can detect one or more contacts on locations corresponding to keys on soft keyboard 530. In response to the contacts on the keys on soft keyboard 530, the work email address in edit field 524-C is edited.

The device detects (618) a second input that corresponds to a request to exit the edit mode for the first column. The second input can be, for example, hitting a "done" or "cancel" button using a finger, stylus, or mouse click, or performing a gesture with a finger or stylus, or mouse. For example, in FIG. 5F, a contact is detected at location 532-A corresponding to done button 528. Alternatively, a contact can be detected at a location corresponding to cancel button 526.

In response to detecting the second input (620), the device exits (622) the edit mode for the first column, and reactivates (624) the plurality of user-selectable items in the second column. For example, in FIGS. 5F through 5I, in response to the contact at location 532-A corresponding to done button 528, column 502-A transitions out of edit mode. Edit fields 524 are replaced by contact information 506-B. In column 504-A, contact names 512, add contact button 514, tabs 516 and 520, and search field 518 are re-enabled and are again selectable by the user.

In some embodiments, in response to detecting the first input (606), the device provides (626) a visual indication that the plurality of user-selectable items in the second column has been deactivated. For example, the second column (e.g., column 504-A) in its entirety, including the items within, can be graying out or otherwise dimmed. As another example, the user-selectable items (e.g., contact names 512, add contact button 514, tabs 516 and 520, and search field 518) can be grayed out or otherwise dimmed.

In some embodiments, the plurality of user-modifiable content items is associated with a user-selectable item in the plurality of user-selectable items (628). For example, a user-selectable item (e.g., contact name 512-A in column 504-A in FIG. 5A) is associated with the plurality of user-modifiable content items (e.g., the set of name and address information 506-A for contact name 512-A in column 502-A in FIG. 5A). Alternatively, editing a user-modifiable content item in column 502-A (e.g., the name of the contact in contact information 506-A in column 502-A in FIG. 5A) also edits a corresponding user-selectable item in column 504-A (e.g., contact name 512-A in column 504-A in FIG. 5A). As another example, selecting a user-selectable item in column 504-A (e.g., name 512-A in column 504-A in FIG. 5A) results in display of a corresponding plurality of user-modifiable content items in column 502-A (e.g., the set of name and address information for name 512-A in column 502-A in FIG. 5A).

In some embodiments, the plurality of user-selectable items includes a list of contacts, and the plurality of user-modifiable content items contains information about a respective currently selected contact from the list of contacts (630), e.g., the respective currently selected contact is highlighted in the second column, and detailed information about the respective currently selected contact is displayed in the first column. For example, in FIG. 5A, the column 504-A includes a list of contact names 512 that are user-selectable. Each contact name 512 represents a contact entity (e.g., an individual, an organization, etc.). The contact information 506-A includes information for a particular contact name 512-A that has been selected from the contact names 512.

In some embodiments, the first column includes a first set of interactive controls that include an edit button (632), e.g., for editing the currently selected contact from the list of contacts). In some embodiments, the first set of interactive controls also includes other buttons, sliders, scrollable lists, navigation interfaces, etc. (e.g., a scrollable address book entry). For example, in FIG. 5A, column 502-A includes one or more buttons, including an edit button 508 and a share button 510. As another example, contact information 506-A can be scrolled using, e.g., a finger gesture.

In some embodiments, the plurality of user-selectable items includes a second set of interactive controls and a scrollable list of contacts (634). In some embodiments, the second set of interactive controls includes buttons, sliders, scrollable lists, navigation interfaces, etc. For example, column 504-A includes tabs 516 and 520, search field 518, and a list of contact names 512. The contact names 512 are vertically scrollable using, for example, a finger or stylus gesture.

In some embodiments, the first input is an activation of an interactive control in a first set of interactive controls in the first column (636), e.g., selection of an "edit button" in the first column. For example, in FIG. 5A, a contact is detected at location 522-A that corresponds to edit button 508. In response to detection of the contact at location 522-A, the contact list application, including columns 502-A and 504-A, enters edit mode.

In some embodiments, the first input is an activation of an interactive control in a second set of interactive controls in the second column (638), e.g., selection of an "add contact button" in the scrollable list of contacts. For example, column 504-A includes an add contact button 514. The contact list application, including columns 502-A and 504-A, enters edit mode in response to detection of a contact at a location corresponding to add contact button 514.

In some embodiments, while the contact list application is in edit mode the plurality of user-modifiable content items includes a plurality of sub-groups of user-modifiable content items, wherein each respective sub-group has a plurality of fields including: one field for each user-modifiable content item in the respective sub-group, and an empty field for adding an additional user-modifiable content item to the respective sub-group (640). In other words, an extra blank field is always displayed for each sub-group of user-modifiable content items, so that the user does not need to access extraneous menus and windows to add content items. For example, there is always a blank "phone number" field and a blank "email address" field. For example, within contact information 506-A, one or more of the items within contact information 506-A are grouped (e.g., a phone numbers sub-group; an email addresses sub-group; an address sub-group). In FIG. 5D, edit fields 524-B and 524-C belong to an email addresses sub-group; field 524-B is filled with a home email address, but field 524-C is empty and an email address (e.g., a work email address) can be added.

In some embodiments, device detects (642) a respective editing input that enters text in an empty field; and in response to detecting the respective editing input (644): the device adds (646) an additional user-modifiable content item that includes the entered text to the respective sub-group, and displays (648) a new blank field in the respective sub-group of user-modifiable content items. In other words, when the blank field in a sub-group is filled in, another blank field automatically appears. For example, in FIGS. 5E through 5F, a work email address is entered into a blank email field (e.g., edit field 524-C) using, for example, the soft keyboard 530. The entered work email address is added to the emails subgroups and a new blank email field (e.g., edit field 524-G) appears.

In some embodiments, the device detects (650) a respective editing input that corresponds to a command to delete all text from a respective field in a respective sub-group; and in response to detecting the respective editing input (652): the device deletes (654) all text from the respective field, and removes (656) the blank field from the respective sub-group. In other words, when the text in a respective preexisting field is deleted, the respective preexisting field becomes the blank field. Consequently the other blank field is no longer needed, and is thus removed from the sub-group. For example, in FIG. 5F, if the work email address 524-C is deleted (e.g., by hitting button 525-B), edit field 525-G is removed and field 524-C becomes a blank field.

In some embodiments, deactivating (610) the plurality of user-selectable items in the second column includes preventing (658) the activation of any of the plurality of user-selectable items in the second column. For example, scrollable lists are no longer scrollable, buttons (e.g., button 514) are no longer enabled (i.e., they are disabled or not available for selection), tabs and search fields (e.g., tabs 516, 520; search filed 518) are disabled (i.e., they are no longer available for selection or activation), etc.

In some embodiments, providing (626) the visual indication that the plurality of user-selectable items in the second column has been deactivated includes one or more of the following: de-emphasizing (660) the second column; and sliding (662) the second column at least partially off of the display. The de-emphasizing can include, for example, one or more of: decreasing saturation, contrast, brightness; graying out; changing the transparency level; etc. Moving the second column at least partially of the display can include, for example, sliding the user interface including the first column and the second column in a first direction so as to slide at least a portion of the second column off of the display and center the first column on the display. For example, column 504-A in FIGS. 5B through 5H can be de-emphasized by graying out the column. In FIGS. 5B through 5D, column 504-A is depicted as moving at least partially off of the display, columns 504-A and 502-A are shown as sliding sideways together so that at least a part of column 504-A is off of the display.

In some embodiments, the multifunction device includes a landscape mode and a portrait mode (664), and providing (626) the visual indication that the plurality of user-selectable items in the second column have been deactivated includes: when the device is in landscape mode, sliding (666) the second column in a first direction (e.g., sideways) so that the second column is moved at least partially off of the display; and when the device is in portrait mode, sliding (668) the second column in a second direction (e.g., upwards) that is perpendicular to the first direction and subsequently sliding the second column in the first direction so that the second column is moved at least partially off of the display. For example, in FIGS. 5B through 5D, column 504-A (in landscape orientation) is depicted as sliding sideways (direction indicated by arrow 523) at least partially off of the display. In FIGS. 5K through 5M, column 504-B (in portrait orientation) is depicted as sliding sideways (direction indicated by arrow 538) at least partially off of the display. Optionally, column 504-B can also slide upward (direction indicated by arrow 550) before sliding sideways. It should be understood that these directions are relative to the orientation of the elements in the user interface, not the orientation of the physical device (e.g., "sideways" is perpendicular to a primary axis of the columns, while "upwards" is parallel to the primary axis of the columns).

In some embodiments, the device includes an accelerometer (e.g., accelerometer(s) 168) to detect rotation of the device. In some embodiments, the device switches from landscape mode to portrait mode, or vice versa, when the device is rotated by more than a predefined amount. Examples of user interface transitions and transformations when changing from landscape mode to portrait mode, or vice versa, are disclosed in U.S. patent application Ser. No. 12/473,846, titled "Rotation Smoothing of a User Interface," filed May 28, 2009, which was incorporated by reference in its entirety above.

In some embodiments, concurrent with sliding (666 or 668) the second column in the first direction, the device slides (670) the first column in the first direction towards a center (e.g., the horizontal center of the display, rather than the vertical center of the display) of the display. For example, in FIGS. 5B through 5D, columns 504-A and 502-A slide sideways together while column 502-A slides toward the horizontal center of touch screen 112. In FIGS. 5K through 5M, columns 504-B and 502-B slide sideways together while column 502-B slides toward the horizontal center of touch screen 112.

In some embodiments, when the multifunction device is in landscape mode, the first column and the second column substantially fill (672) the display vertically (e.g., the first column and the second column extend from the top of the display to the bottom of the display with little or no blank space at the bottom or top of the display); and when the multifunction device is in portrait mode: prior to detecting the first input, displaying another area distinct from the first column and the second column (e.g., a blank space above the first and second column), and in response to detecting the first input, sliding the second column includes sliding the second column to cover at least a part of the other area (674). For example, in FIG. 5A, columns 502-A and 504-A substantially fill the touch screen 112 vertically with little or no blank space above or below columns 502-A and 504-A. In FIG. 5J, columns 502-B and 504-B are displayed with unoccupied space 537-A above the columns and unoccupied space 537-B below the columns. In response to detection of contact 536, as the contact list application enters edit mode, the columns 502-B and 504-B, in addition to sliding sideways, can optionally slide up to occupy at least a portion of space 537-A.

In some embodiments, in response to detecting the first input, the device displays (676) a soft keyboard. For example, while the contact list application is in edit mode (FIG. 5F or 5O), soft keyboard 530 can be displayed.

In some embodiments, the soft keyboard is not initially displayed, and is (instead) displayed in response to a second input (e.g., the first input is activation of an "edit contact" button, and the second input is the selection of a field in the contact entry to edit). For example, in FIGS. 5D through 5F or 5M through 5O, soft keyboard 530 is not displayed (e.g., does not slide up) until an edit field 524 is selected for editing (e.g., detection of a contact at location 527-A or 540-A, respectively).

In some embodiments, in response to the first input, the device slides (678) a soft keyboard upwards from the bottom of the display, wherein: when the device is in landscape mode, sliding the soft keyboard upwards from the bottom of the display includes sliding the soft keyboard upwards to cover at least a portion of the first column and the second column (680); and when the device is in portrait mode, sliding the soft keyboard upwards from the bottom of the display includes sliding the soft keyboard upwards so as to fill at least a part of the space previously occupied by the first column and the second column without covering any portion of the first column or the second column (682). For example, while the contact list application is in edit mode (FIG. 5E or 5N), soft keyboard 530 can slide upward (as indicated by arrow 529 or 541-A, respectively) from the bottom of the touch screen. In landscape orientation (FIGS. 5E through 5F), the keyboard 530 slides upward and obscures portions of columns 502-A and 504-A. In portrait orientation (FIGS. 5E through 5F), keyboard 530 slides up as columns 502-B and 504-B slide up as well; keyboard 530 takes up some space that was occupied by columns 502-B and 504-B, docks right under columns 502-B and 504-B, and does not obscure any part of columns 502-B and 504-B.

Note that details of the processes described above with respect to method 600 (FIGS. 6A-6E) may be applicable in an analogous manner to the method(s) described below, and vice versa. For example, the contact list application and its user interface components, as well as behaviors of the application and its user interface components, described with reference to method 700 below (FIGS. 7A-7C) may have one or more of the characteristics of the contact list application and its user interface components as described with reference to method 600, and vice versa. For brevity, these details are not repeated below.

FIGS. 7A-7C are flow diagrams illustrating a method 700 of modifying a multi-column application in accordance with some embodiments. The method 700 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, the method 700 provides an intuitive way to modify a multi-column application. The method reduces the cognitive burden on a user when modifying a multi-column application, thereby creating a more efficient human-machine interface. For battery-operated computing devices, enabling a user to work with the applications faster and more efficiently conserves power and increases the time between battery charges.

A device displays (702) a multi-column application that includes a portrait mode and a landscape mode. The portrait mode includes (704) a first column, a second column, and another area (e.g., a blank area or a background area above the first column and the second column) distinct from the first column and the second column. The landscape mode includes (706) the first column and the second column, without the other area that is distinct from the first column and the second column. For example, in FIG. 5J, columns 502-B and 504-B are displayed, along with unoccupied space 537-A. In FIG. 5A, columns 502-A and 504-A are displayed, but unoccupied space 537-A is absent. In some embodiments, the columns are displayed as facing, opposite, or adjacent pages, as in a book.

The device detects (708) a first input (e.g., a finger gesture such as a tap gesture on an edit icon, a stylus gesture, a mouse click) that corresponds to a request to edit the first column. For example, contacts are detected at locations 522-A or 536-A, respectively.

In response to detecting the first input (710): when the device is in landscape mode, the device moves (712) (e.g., sliding or translating) the first column and the second column so that the first column is moved towards the center of the display and the second column is moved at least partially off of the display; and when the device is in portrait mode, the device moves (714) (e.g., sliding or translating) the first column and the second column so as to fill at least part of the other area (i.e., the area that is distinct from the first column and the second column), and moves (716) (e.g., sliding or translating) the first column and the second column so that the first column is moved towards the center of the display and the second column is moved at least partially off of the display.

For example, in FIGS. 5B through 5D, columns 504-A and 502-A slide sideways. Column 502-A slides toward the horizontal center of touch screen 112, and column 504-A slide so that a portion of it slides off of the touch screen 112. In FIGS. 5K through 5M, columns 504-B and 502-B slide sideways. Column 502-B slides toward the horizontal center of touch screen 112, and column 504-B slide so that a portion of it slides off of the touch screen 112. Optionally, columns 502-B and 504-B can also slide upward and occupy a portion of area 537-A before sliding sideways.

In some embodiments, the device includes an accelerometer (e.g., accelerometer(s) 168) to detect rotation of the device. In some embodiments, the device switches from landscape mode to portrait mode, or vice versa, when the device is rotated by more than a predefined amount. Examples of user interface transitions and transformations when changing from landscape mode to portrait mode, or vice versa, are disclosed in U.S. patent application Ser. No. 12/473,846, titled "Rotation Smoothing of a User Interface," filed May 28, 2009, which was incorporated by reference in its entirety above.

It should be understood that these directions (e.g., "upwards," "sideways") are relative to the orientation of the elements in the user interface, not the orientation of the physical device (e.g., "sideways" is perpendicular to a primary axis of the columns, while "upwards" is parallel to the primary axis of the columns).

In some embodiments, when the device is in landscape mode, moving (712) the first column and the second column on the display so that the first column is moved towards the center of the display and the second column is moved at least partially off of the display includes moving (718) the first column and the second column on the display in a first direction (e.g., sideways); and when the device is in portrait mode, moving (714) the first column and the second column so as to fill at least part of the other area includes moving (720) the first column and the second column upwards in a second direction that is perpendicular to the first direction. Further, in some embodiments, moving (716) the first column and the second column so that the first column is moved towards the center of the display and the second column is moved at least partially off of the display includes moving (722) the first column and the second column in the first direction. For example, in FIGS. 5B through 5D, both columns 504-A and 502-A slide sideways. In FIGS. 5K through 5M, columns 504-B and 502-B slide sideways. Optionally, columns 502-B and 504-B can also slide upward and occupy a portion of area 537-A before sliding sideways.

In some embodiments, in response to detecting the first input, the device displays (724) a soft keyboard. For example, while the contact list application is in edit mode (FIG. 5F or 5O), a soft keyboard 530 can be displayed.

In some embodiments, the soft keyboard is not initially displayed, and is (instead) displayed in response to a second input (e.g., the first input is activation of an "edit contact" button, and the second input is the selection of a field in the contact entry to edit).

In some embodiments, displaying (724) the soft keyboard includes: when the device is in landscape mode, the soft keyboard covers (726) at least a portion of the first column and the second column; and when the device is in portrait mode, the soft keyboard fills (728) at least a part of an area previously occupied by the first column and the second column without covering any portion of the first column or the second column. For example, in FIG. 5F, soft keyboard 530 obscures portions of columns 502-A and 504-A. In FIG. 5O, soft keyboard 530 occupies space formerly occupied by columns 502-B and 504-B and does not obscure columns 502-B or 504-B.

In some embodiments, displaying (724) the soft keyboard includes sliding (730) a soft keyboard upwards from the bottom of the display, wherein: when the device is in landscape mode, sliding the soft keyboard upwards from the bottom of the display includes sliding (732) the soft keyboard upwards to cover at least a portion of the first column and the second column; and when the device is in portrait mode, sliding (730) the soft keyboard upwards from the bottom of the display includes sliding (734) the soft keyboard upwards so as to fill at least a part of an area previously occupied by the first column and the second column without covering any portion of the first column or the second column. For example, while the contact list application is in edit mode (FIG. 5E or 5N), a soft keyboard 530 can slide upward (as indicated by arrow 529 or 541-A, respectively) from the bottom of the touch screen. In landscape orientation (FIGS. 5E through 5F), the keyboard 530 slides upward and obscures portions of columns 502-A and 504-A. In portrait orientation (FIGS. 5E through 5F), the keyboard 530 slides up to as columns 502-B and 504-B slide up as well; keyboard 530 takes up some space that was occupied by columns 502-B and 504-B, docks right under columns 502-B and 504-B, and does not obscure any part of columns 502-B and 504-B.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The operations described above with reference to FIGS. 6A-6E, 7A-7C may be implemented by components depicted in FIGS. 1A-1C. For example, detection operation 604, edit mode entering operation 608, and deactivating operation 610 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 180 associated with the detection of the event or sub-event. Event handler 180 may utilize or call data updater 176 or object updater 177 to update the application internal state 192. In some embodiments, event handler 180 accesses a respective GUI updater 178 to update what is displayed by the application. Similarly, it would be clear to a person having ordinary skill in the art how other processes can be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A multifunction device, comprising:
   a display;
   a touch-sensitive surface;
   one or more processors;
   memory; and
   one or more programs, wherein the one or more programs are stored in the memory and configured to be executed by the one or more processors, the one or more programs including instructions for:

displaying simultaneously a plurality of columns in a multi-column application that comprises:
   a first column that includes a plurality of user-modifiable content items; and
   a second column that includes a plurality of user-selectable items;
detecting a first input that corresponds to a request to enter an edit mode for the first column;
in response to detecting the first input:
   entering the edit mode for the first column;
   maintaining display of at least a portion of the second column; and
   deactivating the plurality of user-selectable items in the second column;
while in the edit mode for the first column:
   detecting one or more edit inputs; and,
   in response to detecting the one or more edit inputs, editing one or more of the plurality of user-modifiable content items in the first column;
detecting a second input that corresponds to a request to exit the edit mode for the first column; and,
in response to detecting the second input:
   exiting the edit mode for the first column, and
   reactivating the plurality of user-selectable items in the second column.

2. The device of claim 1, including instructions for, in response to detecting the first input, providing a visual indication that the plurality of user-selectable items in the second column have been deactivated.

3. A multifunction device, comprising:
a display;
a touch-sensitive surface;
one or more processors;
memory; and
one or more programs, wherein the one or more programs are stored in the memory and configured to be executed by the one or more processors, the one or more programs including instructions for:
   displaying simultaneously a plurality of columns in a multi-column application that comprises:
      a first column that includes a plurality of user-modifiable content items; and
      a second column that includes a plurality of user-selectable items;
   detecting a first input that corresponds to a request to enter an edit mode for the first column;
   in response to detecting the first input:
      entering the edit mode for the first column;
      deactivating the plurality of user-selectable items in the second column; and
      providing a visual indication that the plurality of user-selectable items in the second column have been deactivated;
   while in the edit mode for the first column:
      detecting one or more edit inputs; and,
      in response to detecting the one or more edit inputs, editing one or more of the plurality of user-modifiable content items in the first column;
   detecting a second input that corresponds to a request to exit the edit mode for the first column; and,
   in response to detecting the second input:
      exiting the edit mode for the first column, and
      reactivating the plurality of user-selectable items in the second column;
wherein:
   the multifunction device includes a landscape mode and a portrait mode; and
   providing the visual indication that the plurality of user-selectable items in the second column have been deactivated includes:
      when the device is in landscape mode, sliding the second column in a first direction so that the second column is moved at least partially off of the display; and
      when the device is in portrait mode, sliding the second column in a second direction that is perpendicular to the first direction, and subsequently sliding the second column in the first direction so that the second column is moved at least partially off of the display.

4. The device of claim 3, including instructions for:
concurrent with sliding the second column in the first direction, sliding the first column in the first direction towards a center of the display.

5. The device of claim 3, wherein:
when the multifunction device is in landscape mode, the first column and the second column substantially fill the display vertically; and
the device includes instructions for:
   when the multifunction device is in portrait mode:
      prior to detecting the first input, displaying another area distinct from the first column and the second column; and
      in response to detecting the first input, sliding the second column includes sliding the second column to cover at least a part of the other area.

6. The device of claim 3, including instructions for:
in response to the first input, sliding a soft keyboard upwards from the bottom of the display, wherein:
   when the device is in landscape mode, sliding the soft keyboard upwards from the bottom of the display includes sliding the soft keyboard upwards to cover at least a portion of the first column and the second column; and
   when the device is in portrait mode, sliding the soft keyboard upwards from the bottom of the display includes sliding the soft keyboard upwards so as to fill at least a part of the space previously occupied by the first column and the second column without covering any portion of the first column or the second column.

7. The device of claim 1, wherein the plurality of user-modifiable content items includes a plurality of sub-groups of user-modifiable content items, wherein each respective sub-group has a plurality of fields including:
   one field for each user-modifiable content item in the respective sub-group, and
   an empty field for adding an additional user-modifiable content item to the respective sub-group.

8. The device of claim 7, including instructions for:
detecting a respective editing input that enters text in an empty field; and,
in response to detecting the respective editing input:
   adding an additional user-modifiable content item that includes the entered text to the respective sub-group; and
   displaying a new blank field in the respective sub-group of user-modifiable content items.

9. The device of claim 7, including instructions for:
detecting a respective editing input that corresponds to a command to delete all text from a respective field in a respective sub-group; and, in response to detecting the respective editing input:
  deleting all text from the respective field; and
  removing the blank field from the respective sub-group.

10. A method, comprising:
at a multifunction device with a display and a touch-sensitive surface:
  displaying simultaneously a plurality of columns in a multi-column application that comprises:
    a first column that includes a plurality of user-modifiable content items; and
    a second column that includes a plurality of user-selectable items;
  detecting a first input that corresponds to a request to enter an edit mode for the first column;
  in response to detecting the first input:
    entering the edit mode for the first column;
    maintaining display of at least a portion of the second column; and
    deactivating the plurality of user-selectable items in the second column;
  while in the edit mode for the first column:
    detecting one or more edit inputs; and,
    in response to detecting the one or more edit inputs, editing one or more of the plurality of user-modifiable content items in the first column;
  detecting a second input that corresponds to a request to exit the edit mode for the first column; and,
  in response to detecting the second input:
    exiting the edit mode for the first column; and
    reactivating the plurality of user-selectable items in the second column.

11. A graphical user interface on a multifunction device with a display, a touch-sensitive surface, a memory, and one or more processors to execute one or more programs stored in the memory, the graphical user interface comprising:
  a plurality of columns displayed simultaneously in a multi-column application, the plurality of columns comprising:
    a first column that includes a plurality of user-modifiable content items; and
    a second column that includes a plurality of user-selectable items;
  wherein:
  a first input that corresponds to a request to enter an edit mode for the first column is detected;
  in response to detecting the first input:
    the edit mode for the first column is entered;
    display of at least a portion of the second column is maintained; and
    the plurality of user-selectable items in the second column is deactivated;
  while in the edit mode for the first column:
    one or more edit inputs are detected; and,
    in response to detecting the one or more edit inputs, one or more of the plurality of user-modifiable content items in the first column are edited;
  a second input that corresponds to a request to exit the edit mode for the first column is detected; and,
  in response to detecting the second input:
    the edit mode for the first column is exited; and
    the plurality of user-selectable items in the second column is reactivated.

12. A non-transitory computer readable storage medium storing one or more programs, the one or more programs comprising instructions, which when executed by a multifunction device with a display and a touch-sensitive surface, cause the device to:
  display simultaneously a plurality of columns in a multi-column application that comprises:
    a first column that includes a plurality of user-modifiable content items; and
    a second column that includes a plurality of user-selectable items;
  detect a first input that corresponds to a request to enter an edit mode for the first column;
  in response to detecting the first input:
    enter the edit mode for the first column;
    maintain display of at least a portion of the second column; and
    deactivate the plurality of user-selectable items in the second column;
  while in the edit mode for the first column:
    detect one or more edit inputs; and,
    in response to detecting the one or more edit inputs, edit one or more of the plurality of user-modifiable content items in the first column;
  detect a second input that corresponds to a request to exit the edit mode for the first column; and,
  in response to detecting the second input:
    exit the edit mode for the first column; and
    reactivate the plurality of user-selectable items in the second column.

13. A method, comprising:
at a multifunction device with a display and a touch-sensitive surface:
  displaying simultaneously a plurality of columns in a multi-column application that comprises:
    a first column that includes a plurality of user-modifiable content items; and
    a second column that includes a plurality of user-selectable items;
  detecting a first input that corresponds to a request to enter an edit mode for the first column;
  in response to detecting the first input:
    entering the edit mode for the first column;
    deactivating the plurality of user-selectable items in the second column; and
    providing a visual indication that the plurality of user-selectable items in the second column have been deactivated;
  while in the edit mode for the first column:
    detecting one or more edit inputs; and,
    in response to detecting the one or more edit inputs, editing one or more of the plurality of user-modifiable content items in the first column;
  detecting a second input that corresponds to a request to exit the edit mode for the first column; and,
  in response to detecting the second input:
    exiting the edit mode for the first column, and
    reactivating the plurality of user-selectable items in the second column;
  wherein:
  the multifunction device includes a landscape mode and a portrait mode; and
  providing the visual indication that the plurality of user-selectable items in the second column have been deactivated includes:
    when the device is in landscape mode, sliding the second column in a first direction so that the second column is moved at least partially off of the display; and
    when the device is in portrait mode, sliding the second column in a second direction that is perpendicular to the first direction, and subsequently sliding the second column in the first direction so that the second column is moved at least partially off of the display.

14. The method of claim 13, including:
concurrent with sliding the second column in the first direction, sliding the first column in the first direction towards a center of the display.

15. The method of claim 13, wherein:
when the multifunction device is in landscape mode, the first column and the second column substantially fill the display vertically; and
the method includes:
when the multifunction device is in portrait mode:
prior to detecting the first input, displaying another area distinct from the first column and the second column; and
in response to detecting the first input, sliding the second column includes sliding the second column to cover at least a part of the other area.

16. The method of claim 13, including:
in response to the first input, sliding a soft keyboard upwards from the bottom of the display, wherein:
when the device is in landscape mode, sliding the soft keyboard upwards from the bottom of the display includes sliding the soft keyboard upwards to cover at least a portion of the first column and the second column; and
when the device is in portrait mode, sliding the soft keyboard upwards from the bottom of the display includes sliding the soft keyboard upwards so as to fill at least a part of the space previously occupied by the first column and the second column without covering any portion of the first column or the second column.

17. A non-transitory computer readable storage medium storing one or more programs, the one or more programs comprising instructions, which when executed by a multifunction device with a display and a touch-sensitive surface, cause the device to:
display simultaneously a plurality of columns in a multi-column application that comprises:
a first column that includes a plurality of user-modifiable content items; and
a second column that includes a plurality of user-selectable items;
detect a first input that corresponds to a request to enter an edit mode for the first column;
in response to detecting the first input:
enter the edit mode for the first column;
deactivate the plurality of user-selectable items in the second column; and
provide a visual indication that the plurality of user-selectable items in the second column have been deactivated;
while in the edit mode for the first column:
detect one or more edit inputs; and,
in response to detecting the one or more edit inputs, edit one or more of the plurality of user-modifiable content items in the first column;
detect a second input that corresponds to a request to exit the edit mode for the first column; and,
in response to detecting the second input:
exit the edit mode for the first column, and
reactivate the plurality of user-selectable items in the second column;
wherein:
the multifunction device includes a landscape mode and a portrait mode; and
providing the visual indication that the plurality of user-selectable items in the second column have been deactivated includes:
when the device is in landscape mode, slide the second column in a first direction so that the second column is moved at least partially off of the display; and
when the device is in portrait mode, slide the second column in a second direction that is perpendicular to the first direction, and subsequently slide the second column in the first direction so that the second column is moved at least partially off of the display.

18. The computer readable storage medium of claim 17, including instructions that cause the device to:
concurrent with sliding the second column in the first direction, slide the first column in the first direction towards a center of the display.

19. The computer readable storage medium of claim 17, wherein:
when the multifunction device is in landscape mode, the first column and the second column substantially fill the display vertically; and
the instructions cause the device to:
when the multifunction device is in portrait mode:
prior to detecting the first input, display another area distinct from the first column and the second column; and
in response to detecting the first input, slide the second column includes sliding the second column to cover at least a part of the other area.

20. The computer readable storage medium of claim 17, including:
in response to the first input, slide a soft keyboard upwards from the bottom of the display, wherein:
when the device is in landscape mode, sliding the soft keyboard upwards from the bottom of the display includes sliding the soft keyboard upwards to cover at least a portion of the first column and the second column; and
when the device is in portrait mode, sliding the soft keyboard upwards from the bottom of the display includes sliding the soft keyboard upwards so as to fill at least a part of the space previously occupied by the first column and the second column without covering any portion of the first column or the second column.

21. The method of claim 10, including, in response to detecting the first input, providing a visual indication that the plurality of user-selectable items in the second column have been deactivated.

22. The method of claim 10, wherein the plurality of user-modifiable content items includes a plurality of sub-groups of user-modifiable content items, wherein each respective sub-group has a plurality of fields including:
one field for each user-modifiable content item in the respective sub-group, and
an empty field for adding an additional user-modifiable content item to the respective sub-group.

23. The method of claim 22, including:
detecting a respective editing input that enters text in an empty field; and,
in response to detecting the respective editing input:
adding an additional user-modifiable content item that includes the entered text to the respective sub-group; and displaying a new blank field in the respective sub-group of user-modifiable content items.

24. The method of claim 22, including:

detecting a respective editing input that corresponds to a command to delete all text from a respective field in a respective sub-group; and, in response to detecting the respective editing input:
  deleting all text from the respective field; and
  removing the blank field from the respective sub-group.

25. The computer readable storage medium of claim 12, including instructions, which when executed by the multifunction device with the display and the touch-sensitive surface, cause the device to, in response to detecting the first input, provide a visual indication that the plurality of user-selectable items in the second column have been deactivated.

26. The computer readable storage medium of claim 12, wherein the plurality of user-modifiable content items includes a plurality of sub-groups of user-modifiable content items, wherein each respective sub-group has a plurality of fields including:
  one field for each user-modifiable content item in the respective sub-group, and
  an empty field for adding an additional user-modifiable content item to the respective sub-group.

27. The computer readable storage medium of claim 26, including instructions, which when executed by the multifunction device with the display and the touch-sensitive surface, cause the device to:

detect a respective editing input that enters text in an empty field; and, in response to detecting the respective editing input:
  add an additional user-modifiable content item that includes the entered text to the respective sub-group; and
  display a new blank field in the respective sub-group of user-modifiable content items.

28. The computer readable storage medium of claim 26, including instructions, which when executed by the multifunction device with the display and the touch-sensitive surface, cause the device to:

detect a respective editing input that corresponds to a command to delete all text from a respective field in a respective sub-group; and, in response to detecting the respective editing input:
  delete all text from the respective field; and
  remove the blank field from the respective sub-group.

* * * * *